United States Patent
Maschmeyer et al.

(10) Patent No.: US 11,941,750 B2
(45) Date of Patent: Mar. 26, 2024

(54) AUGMENTED REALITY ENABLED DYNAMIC PRODUCT PRESENTATION

(71) Applicant: Shopify Inc., Ottawa (CA)

(72) Inventors: Russ Maschmeyer, Berkeley, CA (US); Adam Debreczeni, Bozeman, MT (US); Eric Andrew Florenzano, San Francisco, CA (US); Brennan Letkeman, Calgary (CA); Sarah Hurtgen, Atlanta, GA (US); James Harold Hall, Jr., Atlanta, GA (US)

(73) Assignee: Shopify Inc., Ottawa (CA)

( * ) Notice: Subject to any disclaimer, the term of this patent is extended or adjusted under 35 U.S.C. 154(b) by 57 days.

(21) Appl. No.: 17/670,178

(22) Filed: Feb. 11, 2022

(65) Prior Publication Data

US 2023/0260202 A1  Aug. 17, 2023

(51) Int. Cl.
| | |
|---|---|
| *G06T 15/20* | (2011.01) |
| *G06Q 30/0601* | (2023.01) |
| *G06T 19/00* | (2011.01) |
| *G06T 19/20* | (2011.01) |
| *G06V 20/20* | (2022.01) |

(52) U.S. Cl.
CPC ....... *G06T 15/205* (2013.01); *G06Q 30/0643* (2013.01); *G06T 19/006* (2013.01); *G06T 19/20* (2013.01); *G06V 20/20* (2022.01); *G06T 2219/2021* (2013.01); *G06T 2219/2024* (2013.01)

(58) Field of Classification Search
CPC ..... G06T 15/205; G06T 19/006; G06T 19/20; G06T 2219/2021; G06T 2219/2024; G06V 20/20; G06Q 30/0643
See application file for complete search history.

(56) References Cited

U.S. PATENT DOCUMENTS

| | | | |
|---|---|---|---|
| 2018/0350145 A1* | 12/2018 | Byl | G06T 19/006 |
| 2020/0082632 A1* | 3/2020 | Burns | G06T 19/006 |
| 2020/0302681 A1* | 9/2020 | Totty | G06T 15/205 |
| 2022/0215630 A1* | 7/2022 | Solanki | G10L 15/22 |
| 2022/0221976 A1* | 7/2022 | Agarwal | G06F 3/0486 |

FOREIGN PATENT DOCUMENTS

| | | | | |
|---|---|---|---|---|
| CN | 110069190 A | * | 7/2019 | G06F 1/1643 |
| WO | WO-2021261619 A1 | * | 12/2021 | |

* cited by examiner

*Primary Examiner* — Xin Sheng
(74) *Attorney, Agent, or Firm* — Foley & Lardner LLP

(57) ABSTRACT

Methods and systems for providing a dynamic product presentation are disclosed. In one example, a method comprises identifying, by a processor, a first surface in a first view of a camera feed from a customer device; obtaining, by the processor, a three-dimensional model of a product that corresponds to the first surface; providing, by the processor, an augmented media containing an overlay of a first augmented reality representation of the three-dimensional model of the product in the first view; and responsive to the processor identifying a second surface in a second view of the camera feed from the customer device, revising, by the processor, the augmented media to contain a second augmented reality representation of the three-dimensional model of the product on the second surface in the second view.

20 Claims, 28 Drawing Sheets

FIG. 2

AUGMENTED REALITY ENABLED DYNAMIC PRODUCT PRESENTATION

TECHNICAL FIELD

This application relates generally to graphical user interfaces, and, more particularly, to dynamic revision of graphical user interfaces such as may be employed in scenarios involving/related to augmented reality.

BACKGROUND

A person looking for home decor may want to preview specific products in their surrounding space using augmented reality (AR). Currently, several online retailers have enabled support for viewing products in AR.

BRIEF DESCRIPTION OF THE DRAWINGS

The accompanying drawings constitute a part of this specification and illustrate embodiments of the subject matter disclosed herein.

FIG. 2 shows a home page of an administrator, according to an embodiment.

DETAILED DESCRIPTION

Figure 1:
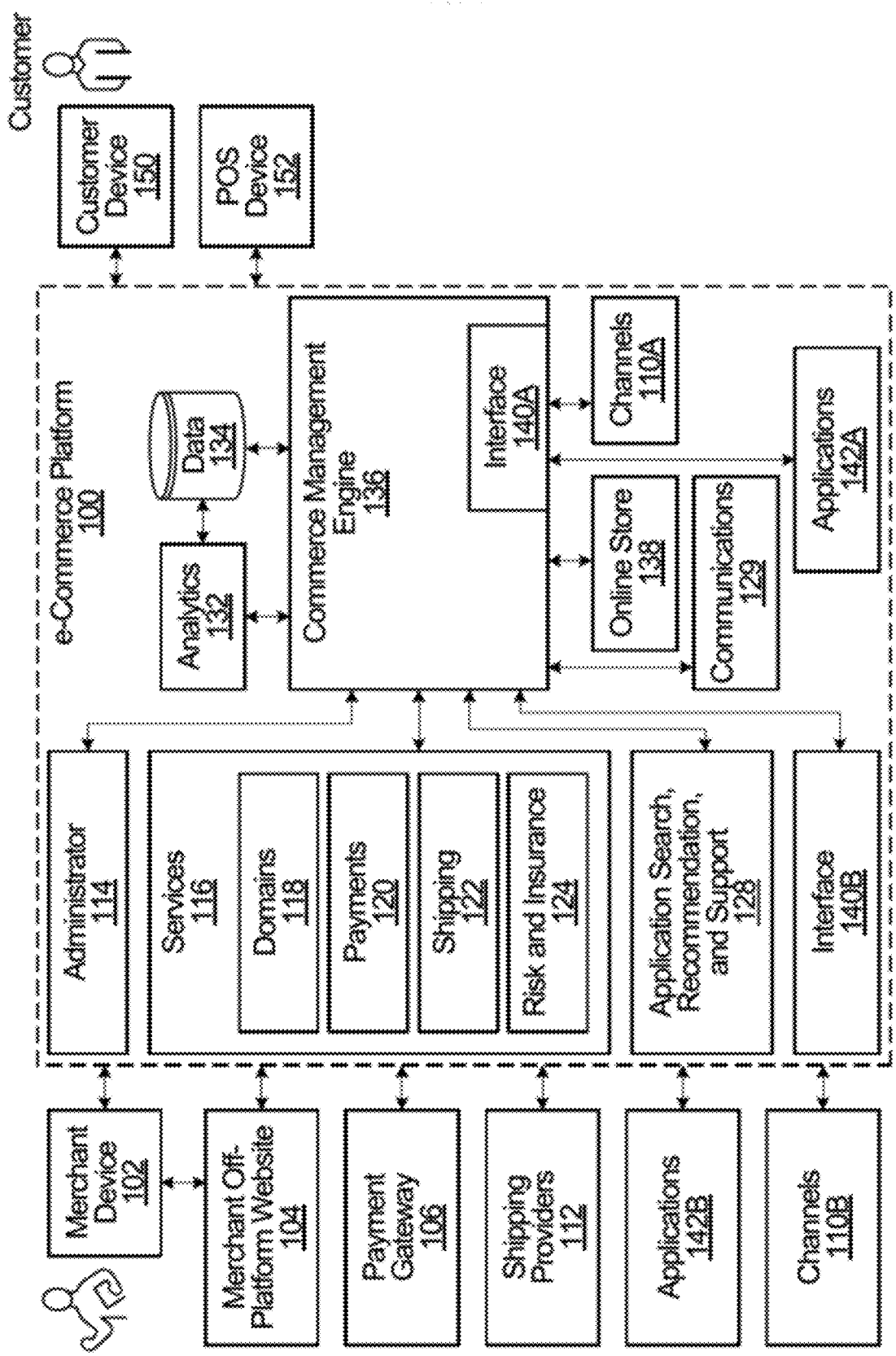
FIG. 1 shows an e-commerce platform, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Currently available systems (e.g., software solutions and tools) may often require customers to select an individual product from a product catalog to preview in AR and select the relevant surface in their home suitable for the product's AR representation. This leads to an inconvenient customer experience when the customer requires multiple pieces of decor for different surfaces, virtual decor or products are not displayed appropriately in an AR environment, or shoppers may not have a specific product in mind when looking to decorate a particular surface in their space.

Moreover, currently available systems (e.g., software solutions and tools) do not recognize the difference between two similarly oriented planes. For instance, both floors and coffee tables have horizontally oriented surfaces. However, a product may not be suitable for both coffee tables and floors. Therefore, conventional and available systems do not distinguish between surfaces that are similar but belong to objects that are categorically different.

To address the above-described drawbacks, an application may use a customer's camera feed to analyze objects surrounding the customer (within the camera feed) and identify suitable surfaces for different products. Using attributes of the identified objects within a defined space (e.g., customer's home) in conjunction with the customer's preferences and/or purchase history, the application may generate a set of product recommendations that are suitable for the identified objects, desirable to the customer (based on their preferences), and/or have physical dimensionality allowing the recommended product to fit within the defined space. The application may also allow the customer to directly purchase the recommended product, thereby improving the customer's shopping experience.

The application may use various surface context detection methods (e.g., plane detection methods such as simultaneous localization and mapping (SLAM)) to identify and distinguish different objects and their corresponding surfaces (e.g., orientation and dimensionality of each surface). Moreover, product classification models may be used to identify the product associated with a detected surface. For instance, one horizontal surface may belong to a couch whereas the other may belong to a coffee table. The product classification may be used as a filter for recommendations. The application may also use other data received from a customer device (e.g., IMU, raycast data, and LIDAR) to identify surfaces and their corresponding depth. For instance, the application may distinguish between objects within the camera view (e.g., couch vs. loveseat, wall vs. ceiling vs. tabletop). The application may also identify attributes of the objects (e.g., colors and style of the objects).

The application may analyze different surfaces (e.g., dimensionality and orientation of different surfaces) to identify the most suitable surface for a recommendation when the application identifies multiple objects and multiple surfaces. In one example, the application may determine a raycast associated with the camera feed and provide an anchoring point on a corresponding surface (e.g., on a flat surface of a table). In another example, the application may determine the most suitable surface/object based on its corresponding size. In another example, the application may determine the suitability of each object based on whether the object already includes other products. For instance, if the application identifies that the walls do not have any decoration but there are multiple vases placed on a table, then the application may identify the wall as the more suitable option for decoration recommendations. In yet another example, the application may determine suitability based on the identified surface's orientation.

After identifying the most suitable surface for a product recommendation (or receiving an indication from the customer), the application may generate a set of product recommendations that are suitable for the surface (e.g., vases are recommended for tables and not for walls). The customer may scroll through the recommendations and instruct the application to display a 3D model representation of the recommended product (e.g., based on a selected anchoring point) in a view of the actual space (e.g., shown in an AR environment).

When the application determines that the camera of the customer device is pointed or panned towards a different view, the application may use the above-described methods to identify new objects within the camera feed. The application may revise a configuration, size, or any other attribute of a 3D model representation of the product on a different surface or object in a different view.

In a non-limiting example, the customer may be pointing the camera at a wall. As a result, the application may display a graphical element indicating that possible recommendations for decoration are available. When authorized by the customer, the application may display a 3D model representation of a picture frame. The customer may use various input elements to revise one or more attributes of the picture frame. For instance, the customer may scroll through different frame styles, sizes, and colors. The customer may also scroll through different images to be included within the frame. The customer may also indicate that the customer is not interested in frames and the application displays a different recommendation (e.g., decorative plates to be placed on the wall).

When the customer selects a set of three picture frames, the application displays an AR representation of the picture frames, such that the picture frames are presented in a real-world view captured by a camera of the customer device. The 3D model representation may display the picture frames with a default configuration (e.g., all picture frames horizontally aligned).

When the customer moves the customer device and thereby repositions the view of the camera, the application may revise at least one attribute of the picture frames accordingly. For instance, if the new view includes a window having dimensionality that would not allow the displayed configuration, the application may reconfigure the picture frames (e.g., two picture frames are aligned horizontally and the last one is placed under or above the horizontally aligned picture frames). In another example, when the customer device is facing a corner, two picture frames may be placed on one wall and the last picture frame may be placed on the adjacent wall. When the customer points the camera at the ceiling, the representation of the picture frames may disappear and anchoring points appear providing the option for product recommendations suitable for a ceiling (e.g., different chandelier recommendations).

In another example, the application may display multiple 3D model representations for multiple products. For instance, the application may display a first 3D model for a couch, a second 3D model for a lamp, and a third 3D model for a picture frame. Using the methods and systems discussed herein, the application can change each product's configuration, orientation, or any other attribute.

Figure 16A:
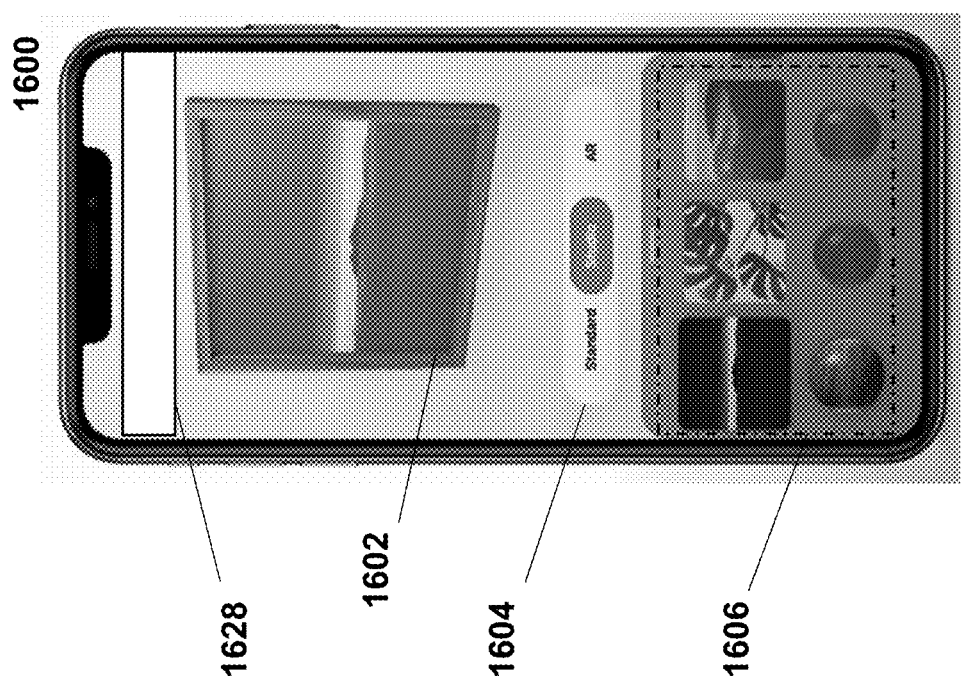
FIGS. 16A-16D show examples of dynamic revisions of graphical user interfaces by a dynamic product presentation system, according to various embodiments.
Figure 16B:
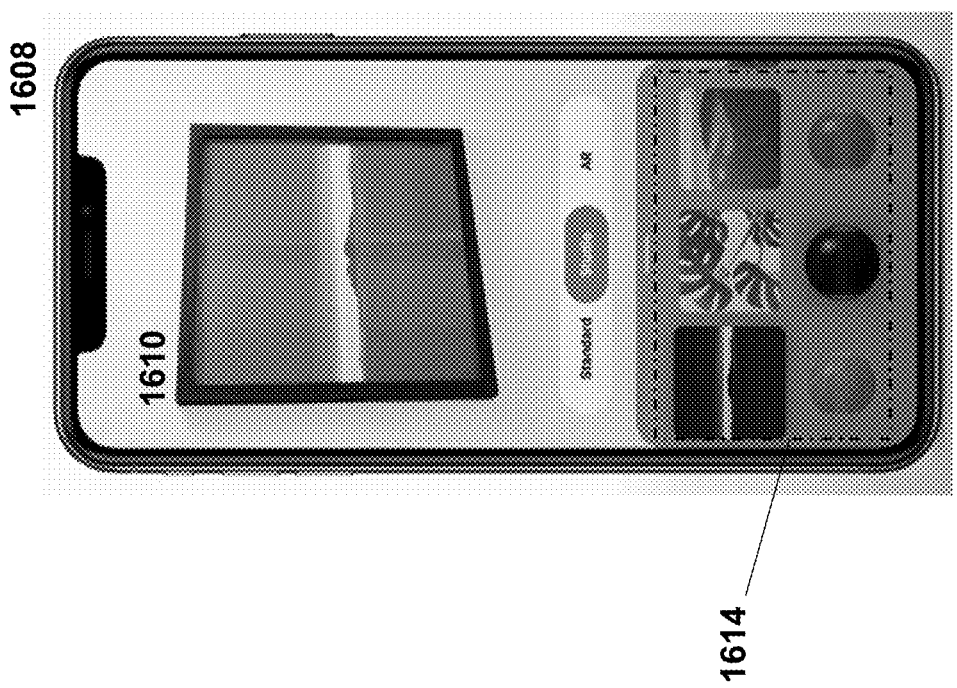
Figure 16C:
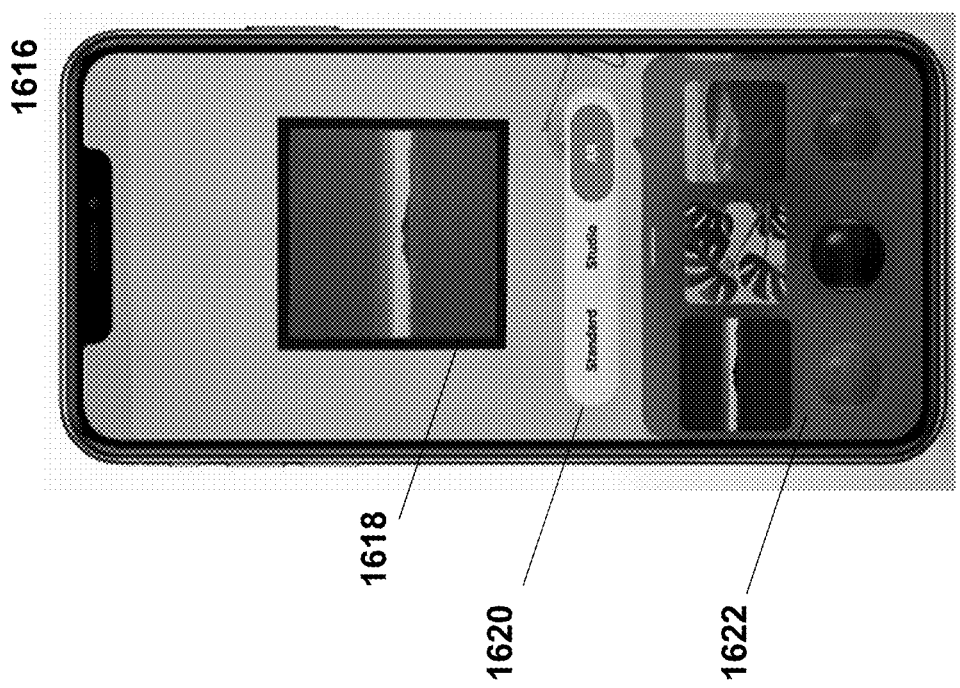

The application may also toggle between an AR representation of the product in a real-world space (e.g., AR representation of a product as depicted in FIGS. 13A-D, 14A-C, and 16B-C) and a 3D representation of the product in a virtual environment (e.g., representation depicted in FIGS. 16A-B). When recommending a product, the application may retrieve a 3D representation of the product in the virtual environment. As used herein, the 3D representation of the product in a virtual environment may refer to any image recreation or animation of the product in the virtual environment. For instance, the 3D representation in a virtual environment may be an animation of a picture frame on a wall where the 3D representation of the product in a virtual environment displays the picture frame from different angles (e.g., moving around the frame that is placed on a wall). In another example, the 3D representation of the product in a virtual environment may include a virtual reality presentation of the product. For instance, having specially designed viewing devices (e.g., virtual reality headsets or glasses), the customer may view the product in a virtual reality environment that may or may not resemble the customer's surroundings and/or a defined area (e.g., a room within the customer's house either selected by the customer or identified by the application using various location-tracking methods).

The application may continuously or periodically monitor the camera feed by communicating with a camera of the customer device. In some configurations, the analytics server may monitor the customer's actions and/or the customer device. Once the analytics server identifies that the customer is viewing the 3D representation displayed or requesting the 3D representation by the analytics server, the analytics server may start monitoring the camera feed to determine whether the camera includes (is pointed towards) a surface that is suitable for a rendering or representation of a 3D model of the product. As discussed herein, the application may use various sensors (e.g., inertial measurement unit (IMU), accelerometer, gyroscope and magnetometer) to identify the movement of the customer device and may adjust the presentation accordingly.

The application may determine whether the camera feed includes an object with a surface that is suitable for the product being displayed/recommended. To determine whether the surface is suitable, the application may evaluate various attributes of the objects and the surfaces using the techniques described above. First, the application may determine whether the surface has a dimensionality that can fit the product. Second, the application may determine whether the surface belongs to an object that is suitable for the product. For instance, the application may use computer vision technology to identify the object. The application may then determine whether the product can be placed on the object by retrieving a set of pre-generated rules (e.g., lookup table). For instance, the application may determine that the product is not suitable to be placed on the table (even though the surface of the object can fit the product) because the product is a chandelier and the object within the camera feed is a table.

When the application determines that the camera feed includes an object having a surface that is suitable for the displayed/recommended product, the application may display a graphical indicator that allows the customer to switch between the 3D view (e.g., the 3D representation of the product in a virtual environment currently being displayed by the application) and an AR representation of the product. An example of the graphical indicator may be a toggle allowing the customer to switch between different displays. Alternatively, a portion of the customer device may display a portion of the customer device's camera feed, and the application may switch to AR mode when the customer interacts with the camera feed display to expand it on the screen, as depicted in FIG. 16A.

The switching of the AR representation of the product and the 3D representation may occur based on a customer input (e.g., customer interacting with a graphical input element) or triggered based on the customer device and/or the camera feed. In one embodiment, the customer may instruct the application to switch between the AR view and the 3D view. In another embodiment, the application may be triggered based on the customer device's movement, as detected based on one more sensors (e.g., IMU sensors, gyroscope, and/or accelerometer). In a non-limiting example, a customer is browsing picture frames on an application executing on a customer device while the customer device is pointed in a downward direction. The application may determine to represent the picture frames in a 3D virtual environment because the customer device's camera does not include a suitable surface within its field of view (e.g., the application does not detect a wall because the application uses IMU and other sensor data to determine that the customer device is pointed downwards and infers that the surface type relevant to the picture frame is not likely to be present while the customer device is in downward orientation). After examining the picture frames, the customer may desire to see what the frames look like on the customer's walls. In order to change the view, the customer may raise the customer device to an upright orientation. The application may then automatically be triggered to activate monitoring the camera feed and will continuously analyze the camera feed to detect a suitable surface. Once the application has identified a suitable surface (e.g., wall), the application automatically switches the view to AR.

The application may customize the virtual environment, such that the application depicts the product in a virtual environment that has one or more attributes of the customer's current view or a predefined space, such as the customer's home or a particular room. For instance, the application may determine that the customer's camera view includes a green wall. As a result, the application may revise the representation of the product to be depicted in a room having green walls. In another example, the application may gradually generate a model (virtual environment) emulating the customer's home (e.g., the application may generate a model of the house based on different camera feeds captured at different times and aggregated to be analyzed). When rendering the view of a product, the application may customize the attributes of the virtual environment to resemble the customer's home.

In another example, the application may generate multiple models or virtual environments. The application may then use a location tracking method to determine the exact location of the customer and depict the product within the corresponding virtual environment. For instance, the application may generate a model for the customer's bedroom and another model for the customer's living room. The application may then determine that the customer is located in the bedroom. As a result, the application depicts the product within a virtual environment that resembles the customer's bedroom. The models may include visual attributes and surface attributes associated with different defined spaces. For instance, different surfaces of the customer's bedroom might be modeled. When the customer is viewing the application in the bedroom while lack of proper lighting does not allow for an AR view of a product, the application may switch to a 3D view of the product in a virtual environment that resembles the customer's bedroom.

In some configurations, the virtual environment may be customized or revised in accordance with an attribute of the product being viewed. For example, the customer may be viewing a dinnerware set so the system generates a virtual environment containing a dining table. In some embodiments, the application may revise an existing virtual environment. For instance, instead of generating a new virtual environment, the application may retrieve a previously generated virtual environment of the customer's dining room and (if the customer's dining room does not include a suitable surface for the product) may include an additional item (e.g., dining table) within the retrieved virtual environment.

I. Example E-Commerce Platform

In some embodiments, the methods disclosed herein may be performed on or in association with a commerce platform, such as an e-commerce platform. Therefore, an example of a commerce platform will be described.

FIG. 1 illustrates an e-commerce platform 100, according to an illustrative system embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the e-commerce platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), and the like. However, even these 'other' merchant commerce facilities may be incorporated into the e-commerce platform 100, such as where POS devices 152 in a physical store of a merchant are linked into the e-commerce platform 100, where a merchant off-platform website 104 is tied into the e-commerce platform 100, such as through 'buy buttons' that link content from the merchant off-platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop-ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms of online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant device 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build web pages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The web browser (or other application) of the customer device 150 then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their web site's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g., as data facility 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an online business, such as providing a domain service 118 associated with their online store, payment services 120 for facilitating transactions with a customer, shipping services 122 for providing customer shipping options for purchased products, risk, and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Even though the shipping services 122 is shown as a part of the e-commerce platform 100, the shipping services 122 may be implemented by a third party, such as a third party delivery or shipping service. The shipping service 122 may have a server/computer in communication with the e-commerce platform 100 where the shipping service 122 may communicate shipping requirements (e.g., shipping weight, categories, restrictions, and preferences). The e-commerce platform 100 may then use these requirements to dynamically update one or more graphical user interfaces discussed herein. The shipping service 122 may then receive delivery instructions from the e-commerce platform 100 and may perform the delivery using a delivery apparatus discussed herein. The shipping service 122 may also be in communication with a delivery provider's servers and/or a delivery apparatus processor, such delivery data (e.g., status of different deliveries) can be communicated to the e-commerce platform 100.

Therefore, shipping service 122 may or may not be a part of the e-commerce platform 100. For instance, the shipping service 122 may be associated with a separate entity that transmits its requirements and receives delivery instructions from the e-commerce platform 100. In another embodiment, the methods and systems discussed herein may be provided as a standalone service where the shipping service 122 utilizes the e-commerce platform 100 to dynamically customize graphical user interfaces and transmit delivery instructions and attributes back to the shipping service 122.

In a non-limiting example, the shipping service 122 represents a server of a delivery platform that utilizes a drone to deliver food. The shipping service 122 first transmits drone delivery requirements to the e-commerce platform 100, such that various graphical user interfaces are revised accordingly. When the customer's order is finalized, the e-commerce platform 100 transmits delivery data (e.g., products and address) to the shipping service 122.

Figure 2:
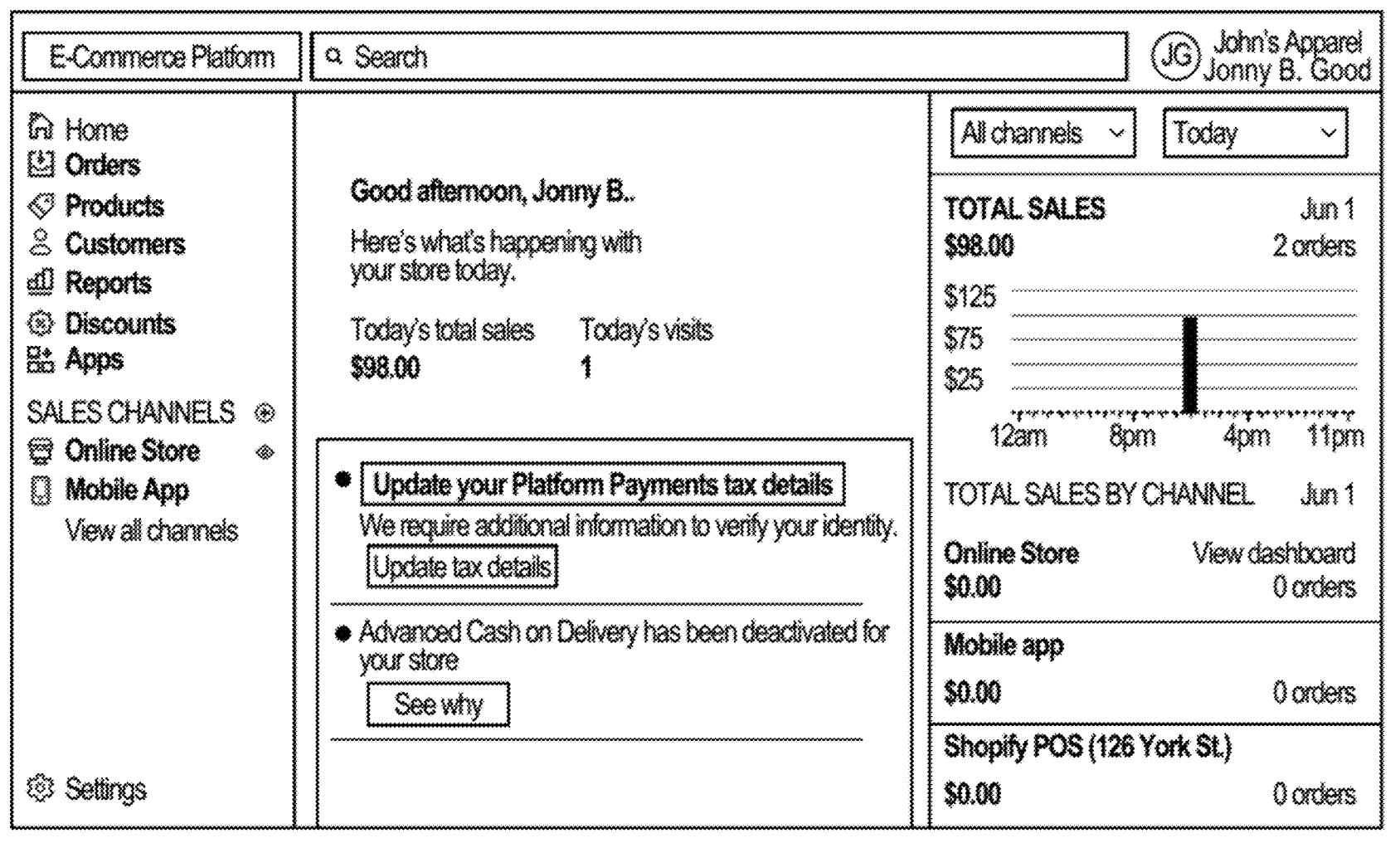

FIG. 2 depicts a non-limiting embodiment for a home page of a merchant administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store 138, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the merchant device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g., via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the e-commerce platform 100 or by a different party. In some embodiments, an application 142B may be provided by the same party providing the e-commerce platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the e-commerce platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the e-commerce platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension or API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or AR interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel-specific. The online store 138 cart may be composed of multiple cart line products, where each cart line product tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and may track quantities for variants that have inventory tracking enabled. It may decouple product variants (a customer-facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that does not provide an API connection). An API fulfillment service may trigger a third-party, where the third-party application creates a fulfillment record. A legacy fulfillment service may trigger a custom API call from the commerce management engine 136 to a third-party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

II. Example Networked Components of System

Figure 3:
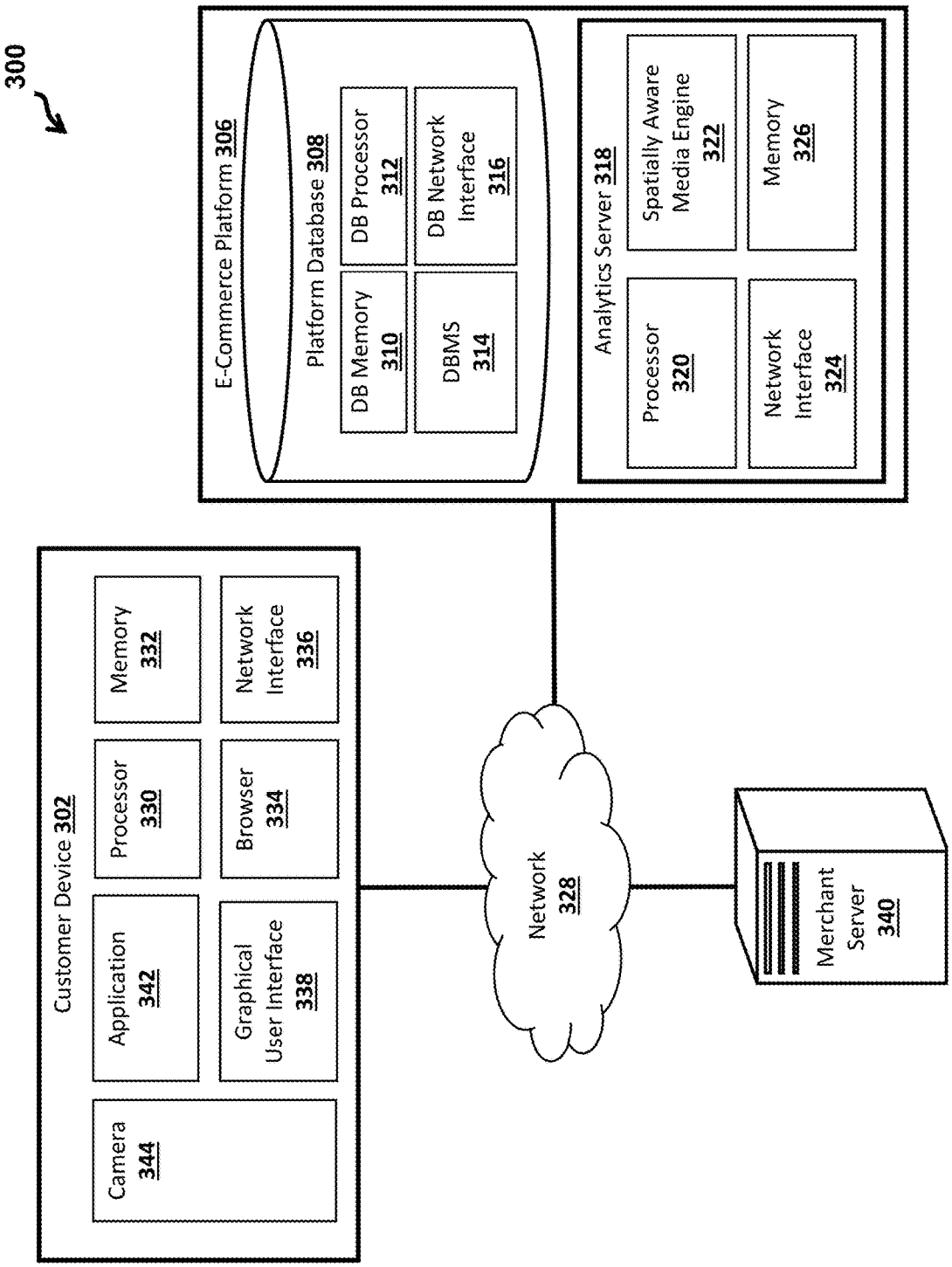
FIG. 3 shows components of a dynamic product presentation system, according to an embodiment.

FIG. 3 illustrates components of a dynamic product presentation system 300, according to an embodiment. The system 300 includes a customer device 302 and a merchant server 340 to connect with an e-commerce platform 306 via a network 328. The depicted system 300 is described and shown in FIG. 3 as having one of each component for ease of description and understanding of an example. The embodiments may include any number of the components described herein. The embodiments may comprise additional or alternative components, or may omit certain components, and still fall within the scope of this disclosure.

The network 328 may include any number of networks, which may be public and/or private networks. The network 328 may comprise hardware and software components implementing various network and/or telecommunications protocols facilitating communications between various devices, which may include devices of the system 300 or any number of additional or alternative devices not shown in FIG. 3. The network 328 may be implemented as a cellular network, a Wi-Fi network, or other wired local area networks (LAN) or wireless LAN, a WiMAX network, or other wireless or wired wide area network (WAN), and the like. The network 328 may also communicate with external servers of other external services coupled to the network 328 such as servers hosting a social media platform, a banking platform, or the merchant server 340.

The network 328 may include any number of security devices or logical arrangements (e.g., firewalls, proxy servers, DMZs) to monitor or otherwise manage web traffic to the e-commerce platform 306. Security devices may be configured to analyze, accept, or reject incoming web requests from the customer device 302, the merchant server 340, and/or the customer device 302. In some embodiments, the security device may be a physical device (e.g., a firewall). Additionally or alternatively, the security device may be a software application (e.g., Web Application Firewall (WAF)) that is hosted on, or otherwise integrated into, another computing device of the system 300. The security devices monitoring web traffic are associated with and administered by the e-commerce platform 306.

The customer device 302 may be any electronic device comprising hardware and software components capable of performing the various tasks and processes described herein. Non-limiting examples of the customer device 302 may include mobile phones, tablets, laptops, and personal computers, among others. When communicating with components of the e-commerce platform 306, the customer device 302 may generate web traffic (or web session data) that is processed by or otherwise accessible to the analytics server 318 of the e-commerce platform 306. The web traffic may comprise data packets that include various types of data that can be parsed, analyzed, or otherwise reviewed by various programmatic algorithms of the analytics server 318. For instance, the web traffic data may indicate which electronic content was accessed by a customer operating the customer device 302.

In an example, a customer operating the customer device 302 accesses a merchant's online store by either visiting a website of the merchant hosted by the merchant server 340 using the browser 334 or executing the application 342. The merchant's online store may include one or more features hosted (or otherwise produced or functionally controlled) by the analytics server 318. For instance, the analytics server 318 may revise one or more features displayed on the merchant's online store. The browser 334 and/or the application 342 may transmit and receive data packets to display various features of the merchant's online store on a GUI 338.

The customer device 302 may also include a camera 344 that can provide media elements (e.g., video feed) to be analyzed and or dynamically revised by the analytics server 318 (e.g., spatially aware media engine 322).

The merchant's online store may refer to any electronic platform that is directly or indirectly hosted by a merchant associated with the merchant server 340. For instance, the merchant's online store may be a website displayed on a browser or a mobile application that is hosted (or otherwise functionally controlled) by the merchant server 340 and/or the analytics server 318. In the embodiments where the merchant's online store is a website, a customer operating the customer device 302 may execute the browser 334 (or other applications) to connect the customer device 302 to the analytics server 318 and/or the merchant server 340 using an IP Address obtained by translating a domain name of the website. The analytics server 318 and/or the merchant server 340 may execute code associated with the website and render the appropriate graphics to be presented to the GUI 338. In embodiments where the merchant's online store is a mobile application, the customer device 302 may execute an application 342 that is installed on the customer device 302.

The customer device 302 and/or the application 342 may then execute the appropriate code to display features of the merchant's online store onto the GUI 338.

Even though certain embodiments described herein describe the website as being hosted by the merchant server 340, the methods and systems described herein also apply to websites associated with the merchant server 340 that are hosted by a third-party web server. Furthermore, the methods described herein are also applicable to any application executed/displayed on the customer device 302 (whether associated with the merchant server 340 or not).

The customer device 302 may be a mobile phone, tablet, gaming console, laptop, or computer owned and/or used by a customer. The customer device 302 may include a processor 330, memory 332, GUI 338, and network interface 336. An example of the GUI 338 is a display screen (which may be a touch screen). The network interface 336 is provided for communicating over the network 328. The structure of the network interface 336 will depend on how the customer device 302 interfaces with the network 328. For example, if the customer device 302 is a mobile phone or tablet, the network interface 336 may include a transmitter/receiver with an antenna to send and receive wireless transmissions to/from the network 328.

The customer device 302 may be connected to the network 328 with a network cable. The network interface 336 may include, for example, a network interface card (NIC), a computer port, and/or a network socket. The processor 330 directly performs or instructs all of the operations performed by the customer device 302. Non-limiting examples of these operations include processing customer inputs received from the GUI 338, preparing information for transmission over the network 328, processing data received over the network 328, and instructing a display screen to display information. The processor 330 may be implemented by one or more processors that execute instructions stored in the memory 332. Alternatively, some or all of the processor 330 may be implemented using dedicated circuitry, such as an ASIC, a GPU, or a programmed FPGA.

The e-commerce platform 306 is a computing system infrastructure that may be owned and/or managed (e.g., hosted) by an e-commerce service and, in some embodiments, may be the same as or similar to that described with reference to FIGS. 1-2, though this need not be the case. The e-commerce platform 306 includes electronic hardware and software components capable of performing various processes, tasks, and functions of the e-commerce platform 306. For instance, the computing infrastructure of the e-commerce platform 306 may comprise one or more platform networks (not shown) interconnecting the components of the e-commerce platform 306. The platform networks may comprise one or more public and/or private networks and include any number of hardware and/or software components capable of hosting and managing the networked communication among devices of the e-commerce platform 306.

As depicted in FIG. 3, the components of the e-commerce platform 306 include the analytics server 318 and a platform database 308. However, the embodiments may include additional or alternative components capable of performing the operations described herein. In some implementations, certain components of the e-commerce platform 306 may be embodied in separate computing devices that are interconnected via one or more public and/or private internal networks (e.g., network 328). In some implementations, certain components of the e-commerce platform 306 may be integrated into a single device. For instance, the analytics server 318 may host the platform database 308.

Furthermore, the e-commerce platform 306 may include the analytics server 318 configured to serve various functions of the e-commerce platform 306. Non-limiting examples of such functions may include webservers hosting webpages and applications (or at least a portion of a webpage or an application) on behalf of merchants (e.g., merchants' online stores), security servers executing various types of software for monitoring web traffic (e.g., determining that a customer has accessed an electronic platform hosted by the merchant server 340), and database servers hosting various platform databases 308 of the e-commerce platform 306, among others.

The illustrative e-commerce platform 306 is shown and described as having only one analytics server 318 performing each of the various functions of the e-commerce service. For instance, the analytics server 318 is described as serving the functions of executing a spatially aware Media Engine 322 and a web server (hosting webpages for merchants' online stores and account administration. It is intended that FIG. 3 is merely illustrative and that embodiments are not limited to the description of the system 300 or the particular configuration shown in FIG. 3. The software and hardware of the analytics server 318 may be integrated into a single distinct physical device (e.g., a single analytics server 318) or may be distributed across multiple devices (e.g., multiple analytics servers 318).

For example, some operations may be executed on a first computing device while other operations may be executed on a second computing device, such that the functions of the analytics server 318 are distributed among the various computing devices. In some implementations, the analytics server 318 may be a virtual machine (VM) that is virtualized and hosted on computing hardware configured to host any number of VMs.

The platform database 308 stores and manages data records concerning various aspects of the e-commerce platform 306, including information about, for example, actors (e.g., merchants, customers, or platform administrators), electronic devices, merchant offerings (e.g., products, inventory, or services), delivery methods, various metrics and statistics, machine-learning models, merchant pages hosting merchant stores, and other types of information related to the e-commerce platform 306 (e.g., usage and/or services).

The platform database 308 may also include various libraries and data tables including detailed data needed to perform the methods described herein, such as revising the merchant's online store. For instance, the analytics server 318 may generate a data table associated with different products offered by different merchants and/or merchants' online stores. In another example, the analytics server 318 may generate and periodically update a customer profile associated with different customers where data records within the customer profile include data associated with different customers (e.g., historical purchases, purchase preferences, and/or payment information). For instance, different products offered by a merchant can be stored, such that they can be dynamically presented to different customers in accordance with their preferences and purchase history.

Various predetermined rules, regulations, and thresholds discussed herein may be set by the analytics server 318 or a system administrator of the e-commerce platform 306. Additionally or alternatively, the customer operating the customer device 302 and/or the merchant server 340 may input or modify the predetermined rules.

The platform database 308 may be hosted on any number of computing devices having a processor (sometimes referred to as a database (DB) processor 320) and non-transitory machine-readable memory configured to operate as a DB memory 310 and capable of performing the various processes and tasks described herein. For example, one or more analytics servers 318 may host some or all aspects of the platform database 308.

A computing device hosting the platform database 308 may include and execute database management system (DBMS) 314 software, though a DBMS 314 is not required in every potential embodiment. The platform database 308 can be a single, integrated database structure or may be distributed into any number of database structures that are configured for some particular types of data needed by the e-commerce platform 306. For example, a first database could store customer credentials and be accessed for authentication purposes, and a second database could store raw or compiled machine-readable software code (e.g., HTML, JavaScript) for webpages such that the DB memory 310 is configured to store information for hosting webpages.

The computing device hosting the platform database 308 may further include a DB network interface 324 for communicating via platform networks of the e-commerce platform 306. The structure of the DB network interface 316 will depend on how the hardware of the platform database 308 interfaces with other components of the e-commerce platform 306. For example, the platform database 308 may be connected to the platform network with a network cable. The DB network interface 324 may include, for example, a NIC, a computer port, and/or a network socket. The processor 320 directly performs or instructs all of the operations performed by the platform database 308.

Non-limiting examples of such operations may include processing queries or updates received from the analytics server 318, customer device 302, and/or merchant server 340; preparing information for transmission via the platform network and/or the external networks. The processor 320 may be implemented by one or more processors that execute instructions stored in the DB memory 310 or other non-transitory storage medium. Alternatively, some or all of the DB processor 312 may be implemented using dedicated circuitry such as an ASIC, a GPU, or a programmed FPGA.

The DB memory 310 of the platform database 308 may contain data records related to, for example, customer activity, and various information and metrics derived from web traffic involving customer accounts. The data may be accessible to the analytics server 318. The analytics server 318 may issue queries to the platform database 308 and data updates based upon, for example, successful or unsuccessful authentication sessions.

The analytics server 318 may be any computing device that comprises a processor 320 and non-transitory machine-readable storage media (e.g., server memory 326) and that is capable of executing the software for one or more functions such as the spatially aware media engine 322. In some cases, the server memory 326 may store or otherwise contain the computer-executable software instructions, such as instructions needed to execute the spatially aware media engine 322. The software and hardware components of the analytics server 318 enable the analytics server 318 to perform various operations that serve particular functions of the e-commerce platform 306.

For example, the analytics server 318 that serves as a web server may execute various types of web server software (e.g., Apache® or Microsoft IIS@). As another example, the analytics server 318 may cause the merchant's online store to be revised in accordance with the methods described herein. The analytics server 318 may either directly revise the online store or instruct the merchant server 340 or any other webserver to revise the online store accordingly. It is intended that these are merely examples and not intended to be limiting as to the potential arrangements or functions of the analytics server 318. Non-limiting examples of the analytics server 318 may include desktop computers, laptop computers, and tablet devices, among others.

The analytics server 318 may execute the spatially aware media engine 322 that directly or indirectly revises the GUI accessed by the customer operating the customer device 302 (merchant's online store). For instance, the spatially aware media engine 322 may transmit an instruction that causes the merchant server 340 (or any other server that is operationally communicating with the customer device 302) to revise one or more products (e.g., display an AR layer) displayed within the online store in accordance with the methods described herein. The location of the spatially aware media engine 322 is merely an example. The spatially aware media engine 322 may be executed by the analytics server 318 and/or by the customer device 302 under the direction of the analytics server 318. Therefore, the spatially aware media engine 322 can be performed locally on a customer's device or in the back-end of the system 300.

Additionally or alternatively, the spatially aware media engine 322 could be provided by the e-commerce platform 306 as a separate web-based or cloud-based service. In some implementations, the spatially aware media engine 322 is implemented at least in part by a customer device such as the customer device 302 and/or the merchant server 340. Other implementations of the spatially aware media engine 322 are also contemplated such as a stand-alone service to dynamically revise features of any website or applications. While the spatially aware media engine 322 is shown as a single component of the e-commerce platform 306, the spatially aware media engine 322 could be provided by multiple different components that are in networked communication with the analytics server 318 executing the spatially aware media engine 322.

Figure 9:
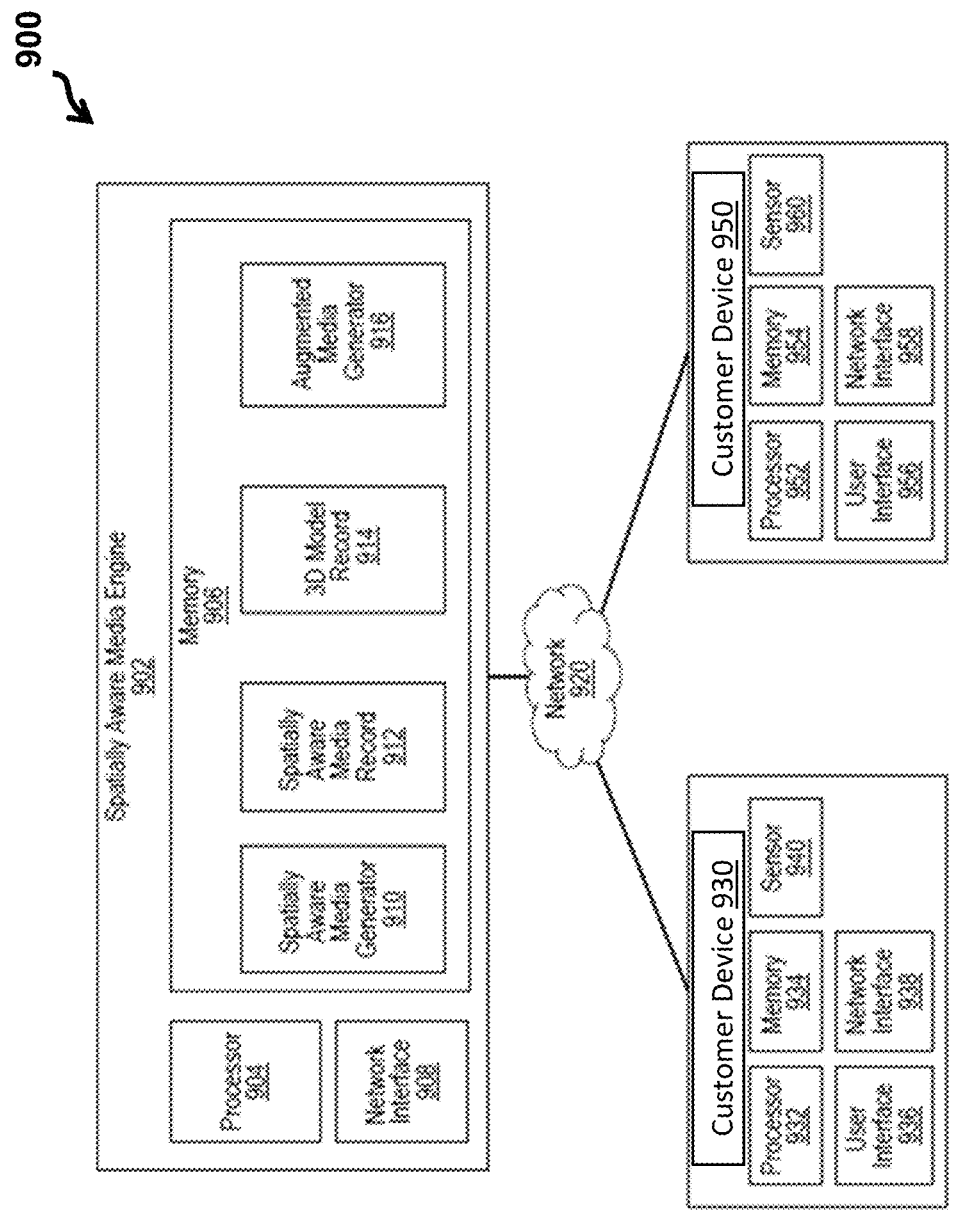
FIG. 9 shows a block diagram illustrating a system for implementing spatially aware media, according to an embodiment.

The spatially aware media engine 322 is further described in FIG. 9.

The merchant server 340 may be any server associated with a merchant hosting an online store. The merchant server 340 may be any computing device hosting a website (or any other electronic platform) accessible to customers (e.g., operating the customer device 302) via the network 328. The merchant server 340 may include a processing unit and non-transitory machine-readable storage capable of executing various tasks described herein. The processing unit may include a processor with a computer-readable medium, such as a random access memory coupled to the processor. Non-limiting examples of the processor may include a microprocessor, an application-specific integrated circuit, and a field programmable object array, among others. Non-limiting examples of the merchant server 340 may include workstation computers, laptop computers, server computers, laptop computers, and the like. While the system 300 includes a single merchant server 340, in some embodiments the merchant server 340 may include a number of computing devices operating in a distributed computing environment.

The merchant server 340 may be configured to interact with one or more software modules of the same or different types depicted within the system 300. For instance, the merchant server 340 may execute software applications configured to host an electronic platform that may generate and serve various webpages to the customer device 302. The electronic platform may also embed various GUIs generated by the analytics server 318. The online store hosted by the merchant server 340 may be configured to require user authentication based upon a set of user authorization credentials (e.g., username, password, biometrics, cryptographic certificate, and the like).

III. Methods and Systems for Displaying Augmented Reality Images

FIGS. 4-11, and their corresponding description, depict and describe how a server, such as the analytics server, can display an AR representation of a product as an additional layer to images (or a video feed) received from a camera feed.

Figure 4:
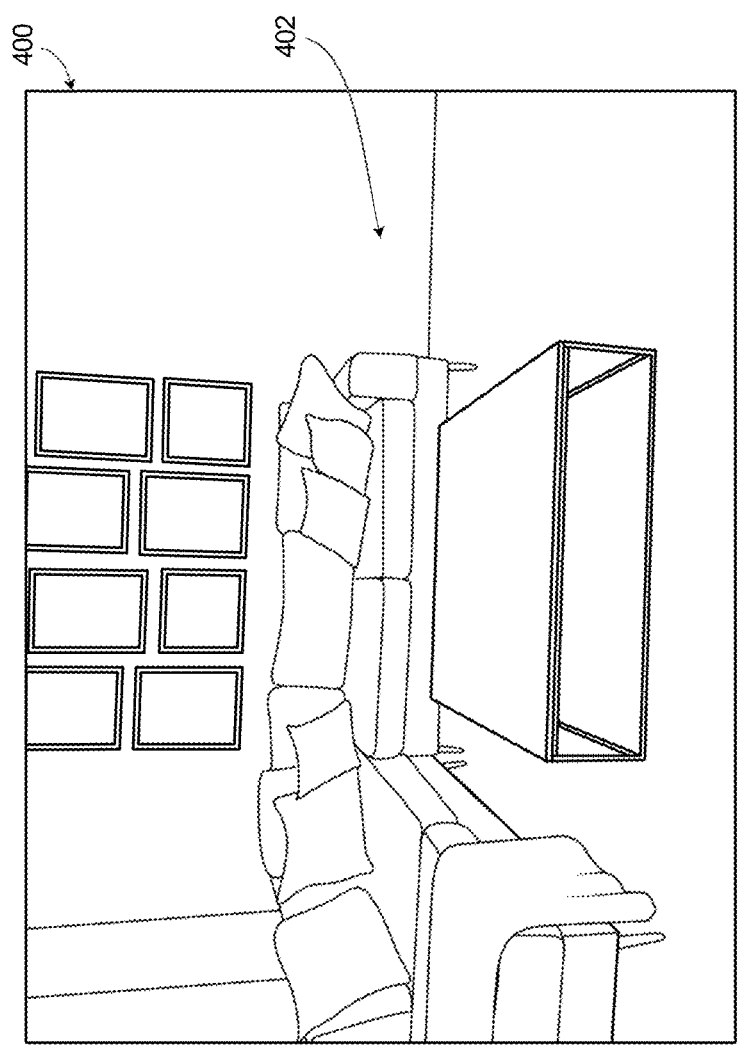
FIG. 4 shows an image of a living room that forms a portion of spatially aware media associated with the living room, according to an embodiment.

FIG. 4 illustrates an image 400 of a living room 402, which forms a portion of the spatially aware media associated with the living room 402. The spatially aware media further includes 3D spatial information identifying the position, size, and shape of 3D surfaces in the living room 402, for example. It should be noted that, as used herein, a position may include both a location and an orientation. The image 400 is a non-limiting example of an image received a customer device (e.g., camera feed).

Figure 5:
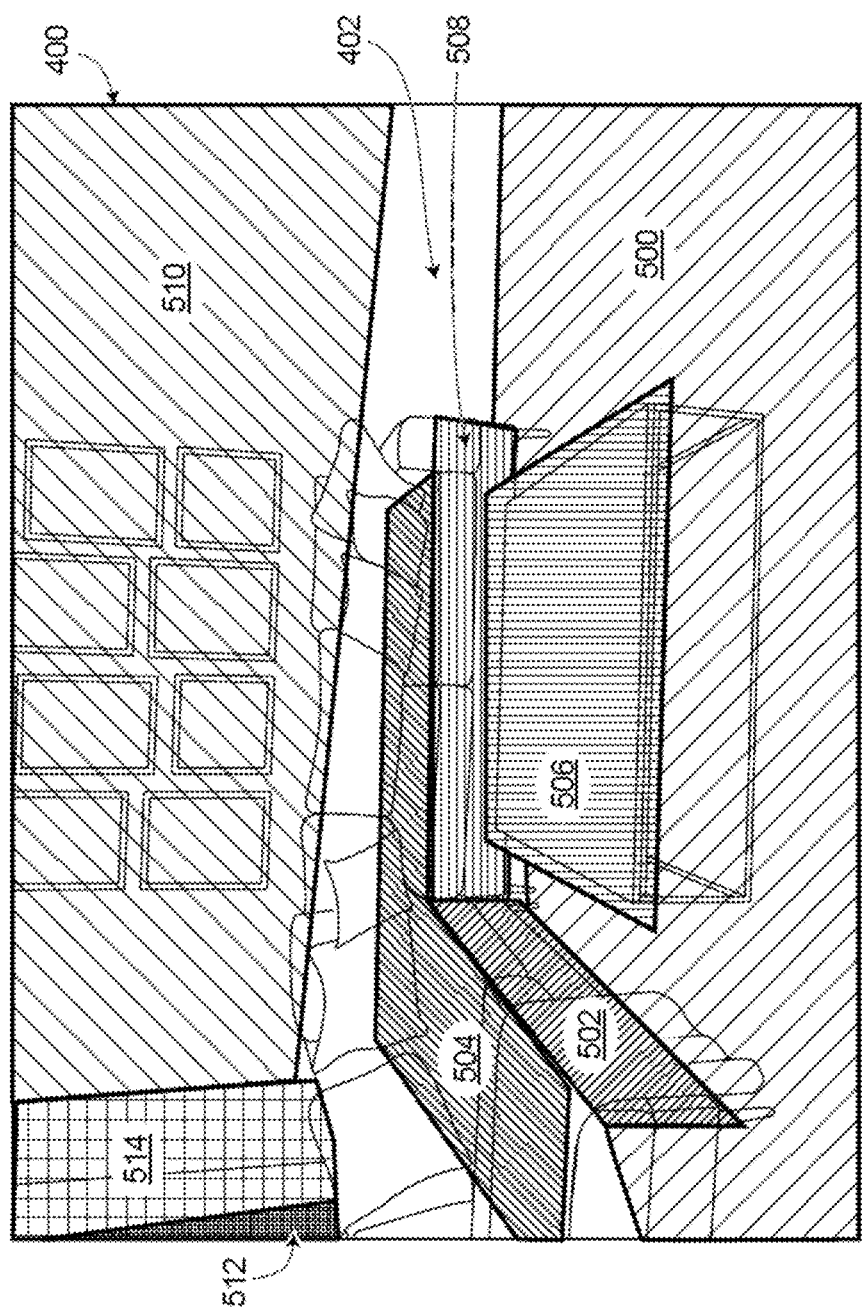
FIG. 5 shows the image of FIG. 4, but with different identified three-dimensional (3D) surfaces of the living room identified, according to an embodiment.

FIG. 5 illustrates the image 400, but with different 3D surfaces 500, 502, 504, 506, 508, 510, 512, 514 of the living room 402 identified using hatching. The analytics server may use a variety of techniques to identify various surfaces within the image 400. The analytics server may use a feature-based mapping technique that allows for recognition of planar surfaces such as walls, tables, counters, or other planar surfaces. The analytics server may identify attributes of each surface. Any, one, some, or all of these surfaces 500, 502, 504, 506, 508, 510, 512, 514 may be stored as 3D spatial information by the spatially aware media associated with the living room 402. In this way, the image 400 is made "spatially aware" by the 3D spatial information identifying the surfaces 500-514.

The analytics server may augment the spatially aware media to include virtual content. In some embodiments, augmenting spatially aware media includes overlaying a render or a representation of a 3D model onto an image of a real-world space that is provided by the spatially aware media. The 3D model may be defined relative to the 3D spatial features of the real-world space that are identified by the spatially aware media. For example, the 3D model may be assigned a position within a coordinate system that has been mapped to the real-world space. A render of the 3D model can then be generated based on the position of the 3D model and on the perspective or viewpoint of the image.

In some cases, the 3D model may be virtually positioned on a surface of the real-world space. The size and orientation of a render of the 3D model may realistically portray the 3D model resting on that surface. The 3D model may also be virtually movable by a customer relative to the 3D spatial features of the real-world space. This can result in the generation of further instances of augmented spatially aware media, which include renders of the 3D model at the new positions. The terms "augmented media" and "augmented spatially aware media" are generally used interchangeably herein.

Augmenting spatially aware media can allow a customer to view and interact with a virtual product when the customer is not able to interact with a physical product. For example, spatially aware media may be augmented to superimpose a virtual representation of a product onto a real-world environment that is captured in an image, which could make the product appear to be present in the real-world environment. The image may be of the customer's home or another location that is relevant to the customer (e.g., customer's predefined space, such as the customer's bedroom), allowing the customer to view the product in an environment that is of interest to them.

Figure 6:
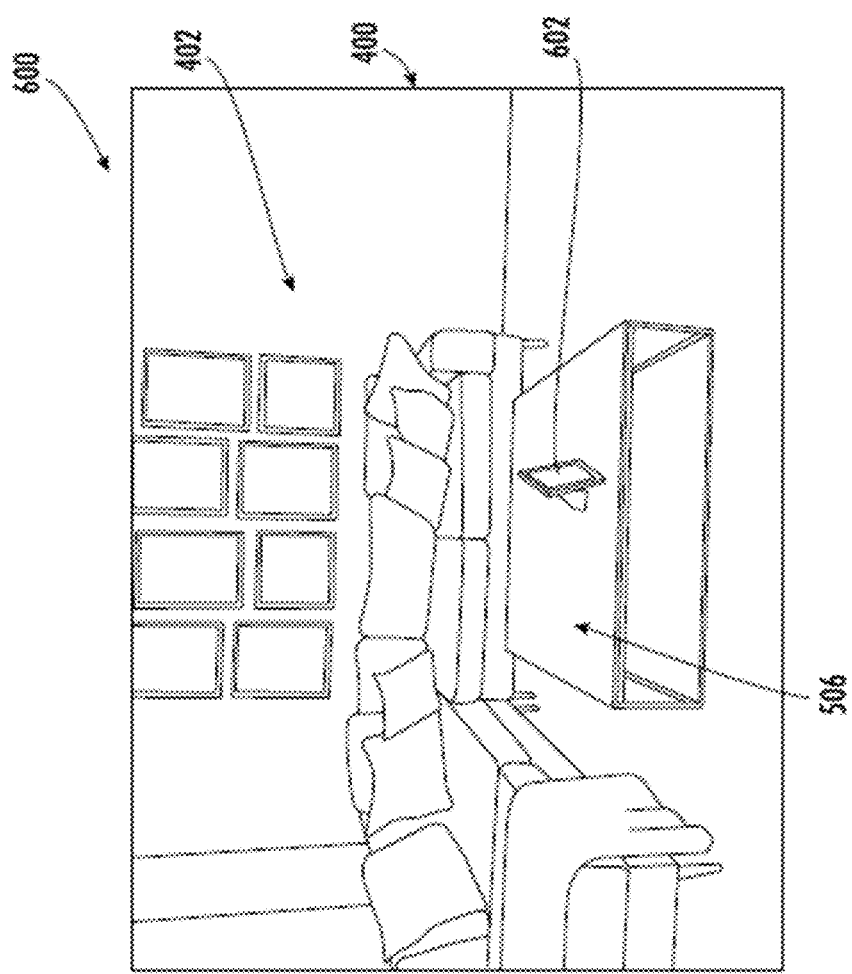
FIG. 6-8 show example instances of augmented spatially aware media associated with the living room of FIG. 4, according to various embodiments.
Figure 7:
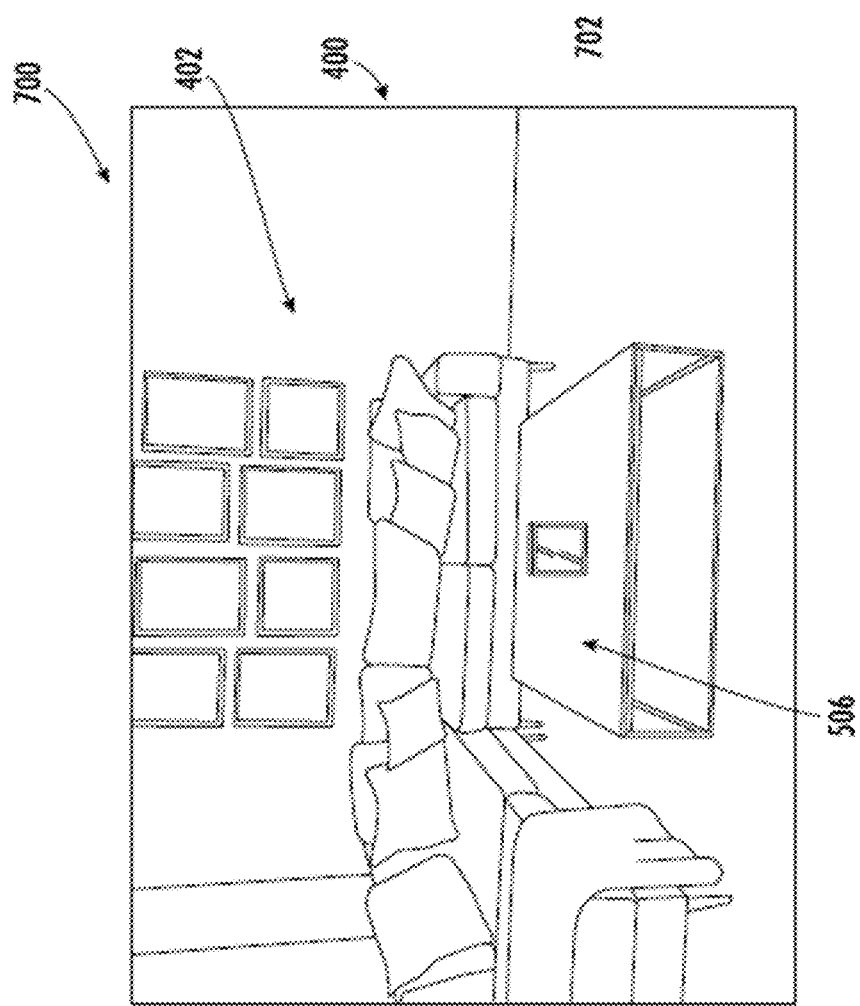

FIGS. 6-7 illustrate example instances 600 and 700 of augmented spatially aware media associated with the living room 402. The instance 600 of augmented spatially aware media includes the image 400 overlaid with a representation 602 of a picture frame. The representation 602 realistically depicts the picture frame resting on the surface 506 of the living room 402, which corresponds to a table of the living room 402. In some implementations, the representation 602 is a render of a 3D model of the picture frame. This 3D model may have been virtually positioned on the surface 506 of the living room 402 using the 3D spatial information included in the spatially aware media for the living room 402. The render of the 3D model (forming the representation 602) may have been generated based on the position of the 3D model relative to the viewpoint of the image 400.

The instance 700 of augmented spatially aware media includes the image 400 overlaid with a different representation 702 of the de picture frame. The representation 702 still depicts the picture frame resting on the surface 506, but at a new position compared to representation 602. More specifically, the picture frame is shown at different orientations in the representations 602, 702. In some implementations, the representation 702 is a render of the 3D model of the picture frame after the 3D model has been virtually repositioned in response to customer input. For example, a customer may have generated an instruction to move the 3D model of the picture frame relative to the 3D spatial features of the living room 402 to the position depicted by the representation 702. In this way, the instance 700 of augmented spatially aware media may be considered an updated version of the instance 600.

A customer can later access the spatially aware media to interact with virtual content in the associated real-world space at any time. Further, the customer does not have to be physically within the real-world space. The customer may access and augment the spatially aware media from other locations. For example, the instances 600 and/or 700 of augmented spatially aware media may have been generated by a customer and/or a customer device that is/are remote from the living room 402. In contrast, using AR, a customer may have to be physically in the living room 402 to view the 3D models of the picture frame.

Spatially aware media is not limited to a single image. In some embodiments, spatially aware media includes multiple different images of a real-world space, each captured from a different perspective or viewpoint in the real-world space. The 3D spatial information provided by the spatially aware media may pertain to all of the images. For example, multiple images of a real-world space may each be mapped to a single 3D scan of the real-world space. The multiple images may share the same 3D spatial information for the real-world space.

Spatially aware media that includes multiple images of a real-world space could enable a customer to view a 3D model within that real-world space from multiple different perspectives. The 3D model may be virtually positioned within real-world space based on the 3D spatial information provided by the spatially aware media. Each of the images may then be augmented with a render of the 3D model that is generated based on the perspective of the image and the relative position of the 3D model. Because the multiple images share the same 3D spatial information for the real-world space, the 3D model may appear to be at the same position relative to the 3D spatial features of the real-world space in each augmented image.

Figure 8:
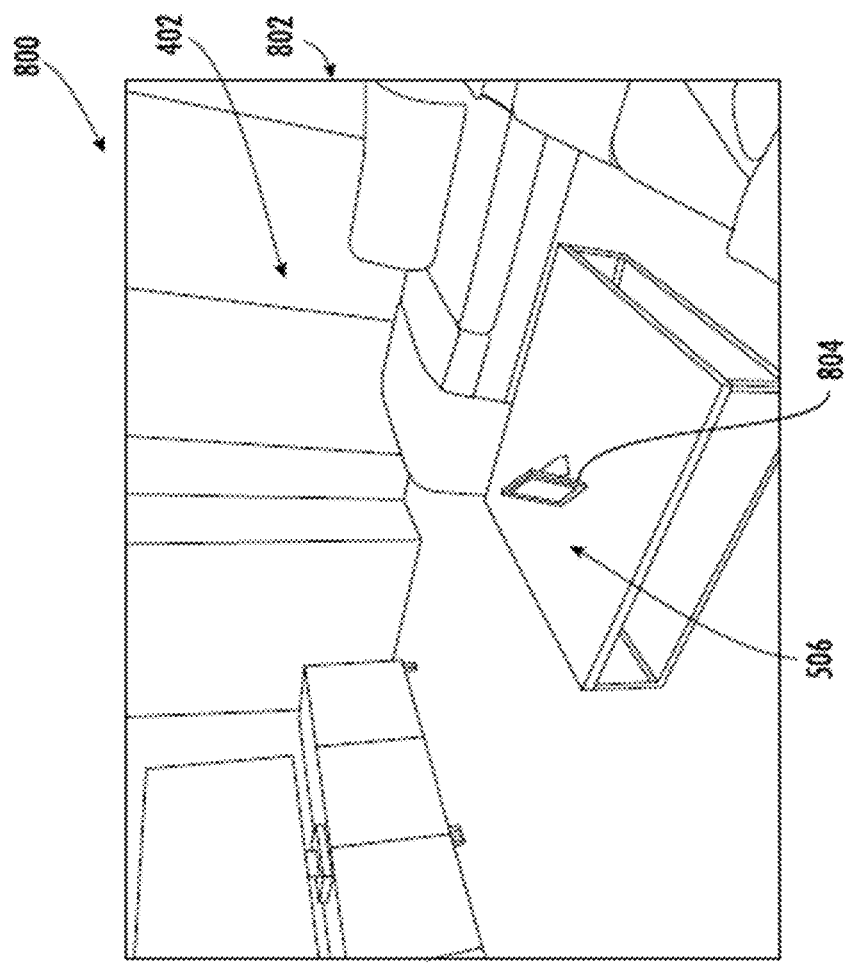

FIG. 8 illustrates another example instance 800 of augmented spatially aware media associated with the living room 402. The instance 800 of augmented spatially aware media includes an image 802 of the living room 402 but from a different viewpoint of the living room 402 than the image 400. The image 802 also forms a portion of the spatially aware media associated with the living room 402. The 3D spatial features of the living room 402 identified by the spatially aware media, which may include but are not limited to the surfaces 500-514 shown in FIG. 5, may be mapped to the image 802 to provide 3D spatial information for the image 802.

In some implementations, each of the images 400, 802 have a corresponding position defined within a coordinate system that is mapped to the living room 402 and stored by the spatially aware media for the living room 402. These positions may include a coordinate, an orientation, and an angle of view within the coordinate system, allowing the field of view of each image 400, 802 to be determined. As shown in FIG. 8, the image 802 is overlaid with a representation 804 of the picture frame resting on the surface 506. The representation 804 generally depicts the picture frame at the same position within the living room 402 as the representation 602 of FIG. 6. However, the representation 804 captures the picture frame from the viewpoint of the image 802. In this way, the instances 600, 800 of augmented spatially aware media depict the picture frame at the same position within the living room 402, but from different perspectives. In some implementations, the representations 602, 804 are each different renders of the same 3D model of the picture frame defined at a position relative to the 3D spatial features of the living room 402. Each render may be generated based on the respective viewpoints of the images 400, 802, thereby providing the different perspectives of the picture frame within the living room 402.

The movement of a 3D model may be tracked across multiple images provided by spatially aware media. For example, in the case that customer input generates an instruction to move the 3D model of the picture frame from the position shown by the representation 602 of FIG. 6 to the position shown by the representation 702 of FIG. 7, both of the images 400 and 802 may be augmented to depict the new position of the 3D model.

In some implementations, multiple images provided by spatially aware media correspond to different frames of a video capturing a real-world space, such as a camera feed associated with a customer device. By way of example, the images 400 and/or 802 might be different frames of a video of the living room 402. After augmenting the different frames to include respective renders of a 3D model, the 3D model would appear to be in the same position within the real-world space in the augmented video. Virtually moving the 3D model within one frame of the video may also be reflected in all of the other frames.

Systems and methods for generating, storing, and augmenting spatially aware media will now be discussed in further detail. While some implementations of these systems and methods are described in the context of commerce applications, it should be noted that the present disclosure is in no way limited to commerce. The systems and methods disclosed herein may also be implemented in any other application of spatially aware media.

FIG. 9 is a block diagram illustrating a system 900 for implementing spatially aware media, according to an embodiment. The system 900 includes a spatially-aware media engine 902, a network 920, and multiple customer devices 930 and 950. The customer devices 930 and 950 may enable respective customers to engage with spatially aware media. Non-limiting examples of a customer device include a mobile phone, tablet, laptop, projector, headset, and computer. A customer device may be a device that is owned and/or operated by a customer or be a merchant device that is owned and/or operated by a merchant, for example.

The spatially aware media engine 902 and customer devices 930 and 950 may be integrated within the overall system architecture described in FIG. 3 (e.g., as the spatially aware media engine 322 and the customer device 302).

The customer device 930 includes a processor 932, memory 934, user interface 936, network interface 938, and sensor 940. Similarly, the customer device 950 includes a processor 952, memory 954, user interface 956, network interface 958, and sensor 960. The customer device 930 will be described by way of the example below. However, it should be noted that the description of the customer device 930 can also apply to the customer device 950.

The user interface 936 may include, for example, a display screen (which may be a touch screen), a gesture recognition system, a speaker, headphones, a microphone, a haptic device, a keyboard, and/or a mouse. The user interface 936 may be at least partially implemented by wearable devices embedded in clothing and/or accessories, for example. The user interface 936 can present content to a customer, including visual, haptic, and audio content The network interface 938 is provided for communicating over the network 920. The structure of the network interface 938 will depend on how the customer device 930 interfaces with the network 920. For example, if the customer device 930 is a mobile phone, headset, or tablet, then the network interface 938 may include a transmitter/receiver with an antenna to send and receive wireless transmissions to/from the network 920

The processor 932 directly performs or instructs all of the operations performed by the customer device 930. Examples of these operations include processing customer inputs received from the user interface 936, preparing information for transmission over the network 920, processing data received over the network 920, and instructing a display screen to display information. The processor 932 may be implemented by one or more processors that execute instructions stored in the memory 934.

The sensor 940 may be provided to obtain measurements of a real-world space. These measurements may be used to detect, characterize and/or otherwise identify 3D spatial features of the real-world space. The sensor 940 may include one or more cameras, microphones, haptic sensors (e.g., vibration and/or pressure sensors), radar sensors, LIDAR sensors, and sonar sensors, for example. Although the sensor 940 is shown as a component of the customer device 930, the sensor 940 may also or instead be implemented separately from the customer device 930 and may communicate with the customer device 930 and/or the spatially aware media engine 902 via wired and/or wireless connections, for example.

One or both of the sensors 940 and/or 960 might not be implemented in the customer device 930 and/or 950. For example, the customer device 950 may be a desktop computer, without a sensor, that enables a corresponding user to view and interact with pre-generated spatially aware media. In this way, the sensors 940 and/or 960 may be considered optional.

In FIG. 9, two customer devices are shown by way of example. More than two customer devices may be in communication with the spatially aware media engine 902. The network 920 may be a computer network implementing wired and/or wireless connections between different devices, including the spatially aware media engine 902 and the customer devices 930 and 950. The network 920 may implement any communication protocol known in the art. Non-limiting examples of communication protocols include a local area network (LAN), a wireless LAN, an internet protocol (IP) network, and a cellular network.

The spatially aware media engine 902 supports the generation, storage and/or augmentation of spatially aware media. This spatially aware media could be output from the spatially aware media engine 902 for presentation on either or both of the customer devices 930 and 950.

The spatially aware media engine 902 is provided by way of example. Other implementations of a spatially aware media engine are also contemplated. In some implementations, a spatially aware media engine is implemented on one or both of the customer devices 930 and 950. For example, a software application or instance may be installed on the customer device 930 that generates, stores, and/or augments spatially aware media locally (e.g., on the customer device 930).

In some implementations, a spatially aware media engine is provided at least in part by a platform such as, for example, an e-commerce platform, depicted in FIG. 3. For example, a spatially aware media engine could be provided as a core function of the e-commerce platform or as an application or service supported by or communicating with the e-commerce platform. In some implementations, a spatially aware media engine is implemented at least in part by a customer device, such as a customer device or a merchant device. In some implementations, a spatially aware media engine is implemented as a stand-alone service to generate, store and/or augment spatially aware media. While the spatially aware media engine 902 is shown as a single component, a spatially aware media engine could instead be provided by multiple different components that are in communication via a network.

As illustrated, the spatially aware media engine 902 includes a processor 904, memory 906, and a network interface 908. The processor 904 may be implemented by one or more hardware processors that execute instructions stored in the memory 906 or another non-transitory computer-readable medium. Alternatively, some or all of the processor 904 may be implemented using dedicated circuitry, such as an ASIC, a GPU, or a programmed FPGA.

The network interface 908 is provided for communication over the network 920. The structure of the network interface 908 is implementation-specific. For example, the network interface 908 may include a NIC, a computer port, and/or a network socket. The memory 906 stores a spatially aware media generator 910, a spatially aware media record 912, a 3D model record 914, and an augmented media generator 916.

The spatially aware media generator 910 includes, employs, and/or implements one or more algorithms (possibly in the form of software instructions executable by the processor 904) that are capable of generating spatially aware media. The spatially aware media associated with the living room 402 of FIGS. 4 and 5 is an example of spatially aware media that may be generated using the spatially aware media generator 910. In general, spatially aware media can be generated in several different ways.

Figure 10:
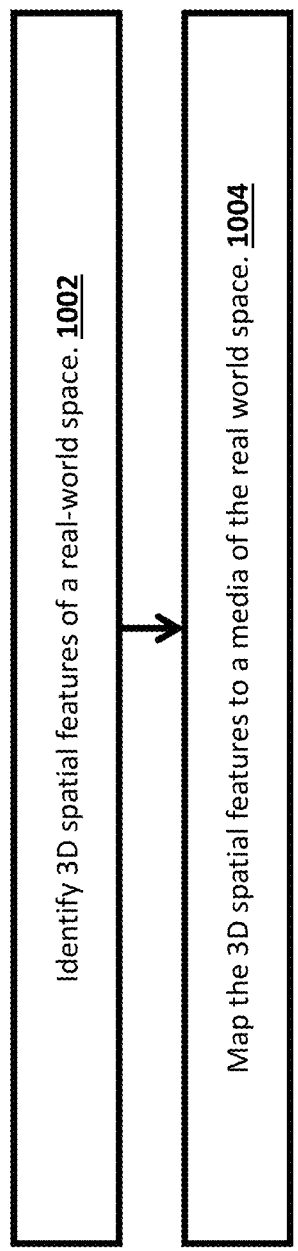
FIG. 10 shows a flow diagram illustrating a method for generating spatially aware media, according to an embodiment.

FIG. 10 is a flow diagram illustrating an example method 1000 for generating spatially aware media, which will be described as being performed by the spatially aware media engine 902. For example, the spatially aware media generator 910 may include instructions that, when executed by the processor 904, cause the processor 904 to perform the method 1000. However, at least a portion of the method 1000 may also or instead be performed elsewhere, such as at one or both of the customer devices 930 and 950.

The method 1000 may be executed to analyze an image (e.g., camera feed received via a camera of a customer device) and map its various features. Using the analyzed image (using the method 1000), a server (e.g., the analytics server) can display an additional layer, such as a 3D model representation of a product onto the image. For instance, the analytics server may analyze images received from the customer device using the method 1000 and then overlay a 3D model of a picture frame on a suitable surface depicted within the images.

In another embodiment, the method 1000 may be used to analyze images received from a customer device to generate a virtual environment that resembles the customer's surroundings (e.g., the customer's room).

Step 1002 includes detecting, characterizing, and/or otherwise identifying 3D spatial features of real-world space. These 3D spatial features may include the surfaces, edges, corners, and/or light sources of the real-world space, for example. Once identified, the 3D spatial features may provide a representation, map, layout, and/or model of the real-world space in 3D. The 3D spatial features may be defined within a coordinate system that is then mapped to the real-world space. The spatially aware media engine 902 may analyze various measurements to identify the 3D spatial features of the real-world space. For example, the shape, dimensions, orientation, location, texture, and/or reflectivity of the 3D spatial features may be determined based on analysis of the measurements.

In some implementations, the measurements obtained and analyzed in step 1002 may include or otherwise provide one or more 3D scans of a real-world space. Obtaining a 3D scan may include moving or rotating a sensor with a real-world space to capture multiple angles of the real-world space. LIDAR, radar, and photogrammetry (creating a 3D model from a series of 2D images) are example methods for generating a 3D scan of a real-world space.

Step 1004 includes mapping the 3D spatial features identified in step 1002 to a media element of the space. For instance, in this step, the analytics server may map the spatial features of a living room to a media element (e.g., images within a camera feed) of the living room. As a result, the analytics server may generate a spatially aware media element of the living room that is enriched with spatial features. Because it is enriched, the spatially aware media element may be used for representation of virtual products, such that the presentation looks more realistic. For instance, because the depth, surfaces, curves, and other attributes of a couch is mapped to an image of a living room, the analytics server may present a virtual cushion on the couch in a way that matches its surface(s), curve(s), and other attributes and looks more realistic. In some implementations, any, one, some, or all of steps 1002 and 1004 is/are performed at least in part using a simultaneous localization and mapping (SLAM) process.

FIG. 5 illustrates an example of 3D spatial features (e.g., the surfaces 500, 502, 504, 506, 508, 510, 512, and 514) that are mapped to the image 400.

In some implementations, step 1004 includes determining or otherwise obtaining a position at which the media was captured in the real-world space. Consider, for example, a case in which an image of the real-world space (e.g., a frame from a view of the camera feed) is obtained. The position (including the location and orientation) of the camera capturing the image within the real-world space can be identified. This position may include a coordinate within a coordinate system that is mapped to the real-world space, for example. The position of the camera, as well as the parameters of the camera, may then be used to determine the image's field of view in the real-world space. These parameters of the camera may include focal length, angle of view, and magnification, for example. The 3D spatial features of the real-world space identified in step 1002 could be mapped to the image based on the field of view of the image, optionally without the need for image analysis to be performed on the image. In this way, the position and parameters of a camera that captures an image of a real-world space can provide a means to map the image to the 3D spatial features of the real-world space.

In some implementations, media and 3D spatial information included in spatially aware media are stored together in the spatially aware media record 912. For example, if the spatially aware media includes an image of a real-world space, then the image and the 3D spatial features captured in that image may be stored in the form of a 3D image or a 3D model. For example, at least some of the pixels in the image could be an assigned XYZ coordinate.

In other implementations, the media and the 3D spatial information included in spatially aware media are stored separately. For example, a 3D scan of a real-world space and an image of the real-world space may be stored separately in the spatially aware media record 912. A mapping between the 3D scan and the image may also be stored in the spatially aware media record 912, allowing the 3D spatial features captured in the image to be identified based on this mapping. For example, the mapping may include a position (including a location and an orientation) of the camera that captured the image relative to the 3D spatial features and the field of view of the camera.

The 3D model record 914 may include virtual 3D models of objects, products, buildings, locations, scenery, people, anatomical features, animals, and/or any other type of entity. A 3D model is a mathematical representation of an entity that is defined with length, width, and height. A 3D model may be positioned or otherwise defined within a 3D coordinate system, which could be a Cartesian coordinate system, a cylindrical coordinate system, or a polarcoordinate system, for example. A 3D model may be entirely computer-generated or may be generated based on measurements of a real-world entity. Possible methods for generating 3D models from a real-world entity include photogrammetry and 3D scanning.

As illustrated in FIGS. 6-8, for example, a 3D model (e.g., picture frame) may be implemented in spatially aware media. This may allow a virtual object to be viewed at various angles within a representation of a real-world space. In some implementations, one or more 3D models stored in the 3D model record 914 provide virtual representations of products sold online by merchants. Spatially aware media may be augmented using these 3D models to present the products to a customer. The 3D models in the 3D model record 914 could be obtained in several different ways. In some implementations, at least some of the 3D models are obtained from a user of the spatially aware media engine 902, such as from a customer or a merchant.

A merchant could generate one or more 3D models for any, one, some, or all of the products sold in their stores. These 3D models may be provided directly to the spatially aware media engine 902 by the merchant, and/or the spatially aware media engine 902 may obtain the 3D models from a merchant's account on an e-commerce platform and/or from the merchant's online store. 3D models may also be obtained from other platforms, such as social media platforms, for example. In addition, some 3D models may be generated locally at the spatially aware media engine 902. For example, images or scans that are obtained by the spatially aware media engine 902 can be used to generate a 3D model.

The augmented media generator 916 includes, employs, and/or implements one or more algorithms (possibly in the form of software instructions executable by the processor 904) that are capable of generating instances of augmented spatially aware media. FIGS. 6-8 provide examples of instances of augmented spatially aware media.

To generate an instance of augmented spatially aware media, possible inputs to the augmented media generator 916 include (i) spatially aware media, optionally obtained from the spatially aware media record 912, (ii) one or more 3D models, optionally obtained from the 3D model record 914, and (iii) a position or "anchoring point" for a 3D model relative to the 3D spatial features identified by the spatially aware media. The virtual position may be obtained from user input at one or both of the customer devices 930, 950, for example. Alternatively, as discussed herein, the position may be automatically determined by the spatially aware media engine 902.

Instances of augmented spatially aware media that are output by the augmented media generator 916 may include visual, haptic, and/or audio content that is added to spatially aware media. This visual, haptic, and/or audio content may be obtained from, or otherwise based on, a 3D model that is defined relative to the 3D spatial features of the corresponding real-world space. In this way, when added to the spatially aware media, the visual, haptic, and/or audio content may match the 3D spatial features of the real-world space.

Visual content may allow a customer to view a virtual object within an image provided by spatially aware media. This visual content may be generated and/or overlaid with an image based on a virtual position of the object relative to a viewpoint of the image in the corresponding real-world space.

Instances of augmented spatially aware media can be continuously or intermittently updated by the augmented media generator 916 in response to user input. For example, if a 3D model is moved to a new virtual position relative to the 3D spatial features of spatially aware media, then a new instance of augmented spatially aware media including updated virtual content can be generated to reflect the new position of the 3D model.

The analytics server may use the method 1000 to generate a virtual environment that resembles a customer's actual surroundings or a defined location (e.g., the customer's bedroom). Using the identified spatial features and/or the media element of the real world space, the analytics server may generate a 3D model (e.g., virtual environment) of the real-world space. As depicted and described in FIGS. 15-16D, the analytics server may represent one or more virtual products within the virtual environment. For instance, the customer may scan a bedroom and the analytics server may identify and aggregate the spatial features of the bedroom.

Figure 11:
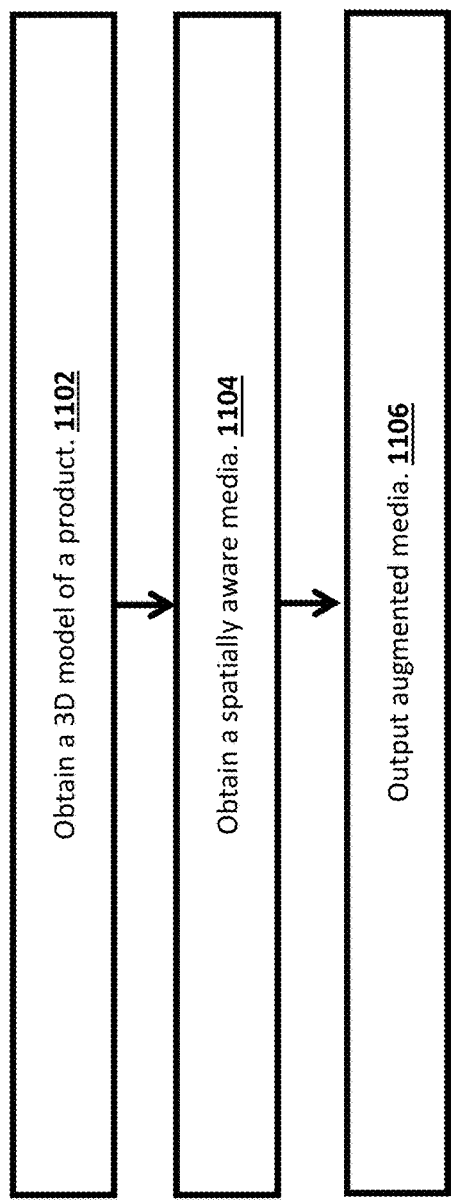
FIG. 11 shows a flow diagram illustrating a method for providing augmented spatially aware media, according to an embodiment.

FIG. 11 illustrates a flow diagram illustrating a method 1100 for providing augmented media, according to an embodiment. The method 1100 will be described as being performed by the spatially aware media engine 902 of FIG. 9. For example, the augmented media generator 916 may include instructions that, when executed by the processor 904, cause the processor 904 to perform the method 1100. However, at least a portion of the method 1100 may instead be performed elsewhere, such as at the customer device 930 and/or the customer device 950, for example.

Step 1102 includes obtaining a 3D model for a product. The analytics server may query a 3D model of a product based on various attributes, such as user preferences and surface types detected. The 3D models may be obtained from the 3D model record 914, or from elsewhere (e.g., third party data repositories).

In some implementations, 3D models may be directly provided to or otherwise obtained by the spatially aware media engine 902, independent of a search query. For instance, a customer may have already selected a product to be visualized using methods and systems discussed herein and the analytics server may retrieve a corresponding 3D model for that particular product.

Step 1104 includes obtaining spatially aware media from the memory 906 or from another computer-readable medium. For example, the spatially aware media may be obtained from the spatially aware media record 912 (e.g., virtual environment). In another example, the spatially aware media may be the camera feed received from the customer device (e.g., FIG. 10).

The spatially aware media may include an image of a real-world space and information identifying 3D spatial features of the real-world space. In some configurations, the camera feed received from the customer device can be analyzed to obtain the spatially aware media in real-time (or near real-time). For example, the customer may wish to view the 3D models obtained in step 1102 in a particular real-world space and may select the spatially aware media accordingly (e.g., the customer may select a virtual environment for the analytics server to present the product in). This real-world space may be a real-world space that is associated with the customer, such as a room of the customer's house.

Step 1106 includes outputting augmented media that is based on the spatially aware media obtained in step 1104 and the 3D model obtained in step 1102. For example, the augmented media may be based on at least some of the 3D models that are included in the results of the search query. Providing the augmented media may include the spatially aware media engine 902 generating the augmented media and/or receiving the augmented media from another device. As outlined elsewhere herein, augmented media may include visual, auditory, and/or haptic content that is added to spatially aware media.

In some implementations, the augmented media provided at step 1106 includes multiple different instances of augmented media. The multiple different instances of augmented media could each include at least a portion of an image of the real-world space overlaid with a render of a respective one of at least some of the 3D models obtained in step 1102. This image of the real-world space may be provided by the spatially aware media obtained in step 1104 and may be defined relative to the 3D spatial features of the real-world space identified by the spatially aware media.

The 3D models may also be defined relative to the 3D spatial features of the real-world space using customer-defined and/or automatically generated positions for the 3D model. Therefore, in each instance of augmented media, a render of a respective 3D model may be overlaid with the image to realistically depict the 3D model within the real-world space.

The multiple different instances of augmented media might be provided at the same time, but this might not always be the case. The multiple instances of the augmented media might instead be provided at different times. For example, the multiple different instances might be provided individually or in groups. In this way, step 1106 might occur in multiple different stages.

In some implementations, the 3D spatial features of the real-world space identified by the spatially aware media may include a surface within the real-world space. One or more 3D models may be defined relative to the surface, such that the 3D models are adjacent to the surface. A render of each 3D model might then depict a corresponding product or other object resting on the surface.

IV. Methods and Systems for a Dynamic Product Presentation

Figure 12:
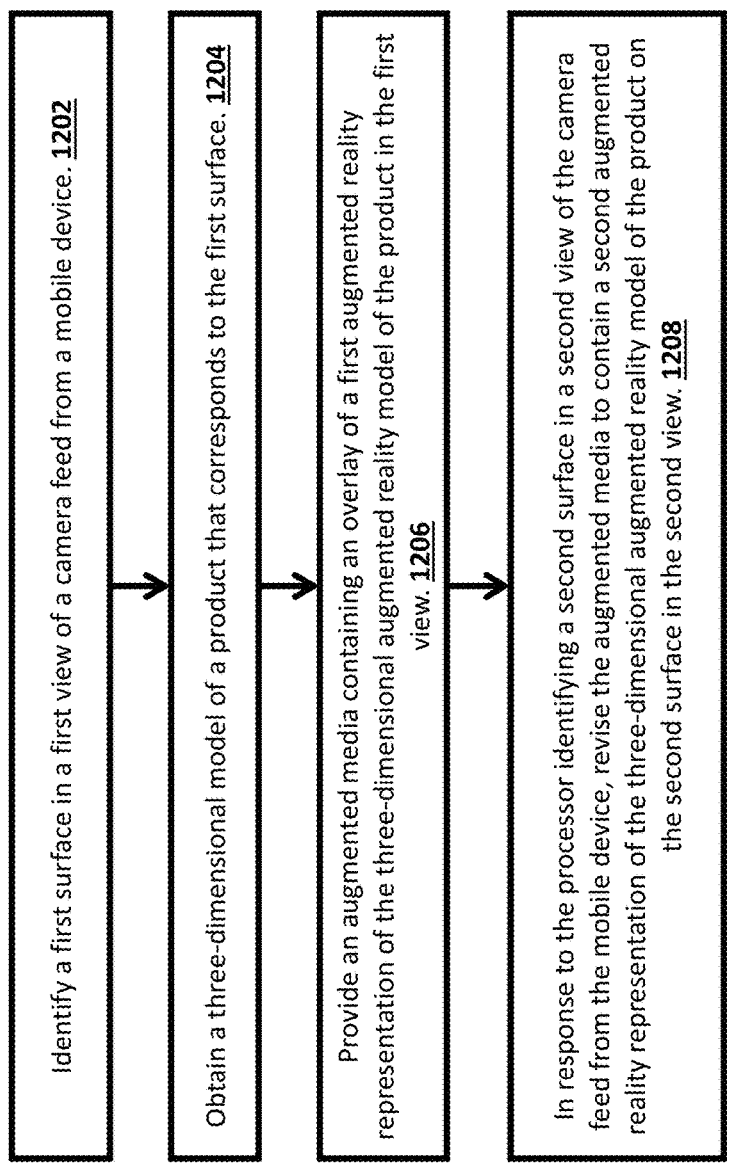
FIG. 12 shows execution steps for a dynamic product presentation system, according to an embodiment.

FIG. 12 illustrates a flowchart depicting operational steps for a dynamic product presentation system, in accordance with an embodiment. The method 1200 describes how a server, such as the analytics server described in FIG. 3, can dynamically revise a GUI presenting a media element depicting a product based on a customer's surroundings.

Even though the method 1200 is described as being executed by the analytics server, the method 1200 can be executed by any server and/or locally within a customer's trusted device (e.g., the customer device discussed in FIG. 3 or FIG. 9). Additionally or alternatively, a server can execute the method 1200 in other computer environments (other than the environments depicted in FIGS. 1-3 and/or 9). For instance, the method 1200 can be executed by a server providing SaaS in a commerce or non-commerce infrastructure for dynamic product presentation.

Additionally or alternatively, the method 1200 may be executed by a web server hosting a page (e.g., a website associated with the merchant's online store or content for a mobile application) and executing various revision methods described herein. Additionally or alternatively, the method 1200 may be executed by a server hosting an application configured to display a page (or a GUI) associated with the merchant's online store and acting as the analytics server by executing various revision methods described herein. Furthermore, other configurations of the method 1200 may comprise additional or alternative steps or may omit one or more steps altogether.

At step 1202, the analytics server may identify a first surface in a first view of a camera feed from a customer device. The analytics server may identify a surface in a first view of a camera feed from a customer device. The analytics server may analyze media elements received from a camera of an electronic device (e.g., customer devices described in FIGS. 3 and/or 9) using various methods discussed herein. For instance, the analytics server may analyze a camera feed (e.g., images or video feed captured by a camera of a customer device) using the methods and systems discussed in FIGS. 4-11. Using the methods and systems described herein, the analytics server may obtain one or more surfaces presented within the customer's camera feed.

In a non-limiting example, as a customer repositions the customer device (e.g., smartphone) around a scene, the analytics server executes a SLAM algorithm to determine a relative position of the customer device (e.g., location of the customer device to the world around it). The analytics server may also detect visually distinct features in the customer device's camera feed and may track these feature points across subsequent video frames to compute the change in the customer device's location. The analytics server may then combine this visual information with data from the customer device's internal measurement unit (IMU) to estimate the real-time position and orientation of the customer device's camera relative to the 3D coordinate space of the world around the customer device (e.g., room in which the customer and their customer device are located).

The analytics server may also utilize plane detection algorithms on the camera feed in combination with processing IMU data to distinguish between different surfaces. For example, floors may be distinguished from walls when the plane detection algorithm returns a horizontally oriented plane while, at the same time, IMU data indicates the device is pointed downwards. Similarly, ceilings may be distinguished from floors when the system detects a horizontal plane while IMU data indicates an upward-facing orientation.

Existing AR applications may be configured to detect horizontally oriented surfaces but are typically unable to determine the context of a particular surface (e.g., unable to distinguish between a tabletop, a floor, or a ceiling). To rectify this problem, the analytics server may distinguish between surfaces (e.g., floors and other horizontally oriented surfaces like tables) by using depth mapping technology and methods such as ray-casting. For instance, the analytics server may determine that the horizontal plane of the table is higher than that of the floor. In compatible devices, LIDAR scanners or other sensors may be used to provide more accurate depth information.

The analytics server may also receive/retrieve a customer identifier associated with the customer. Upon the customer requesting to load the online store (or initiating the application), the application, a browser extension, and/or a web server may transmit an electronic message (e.g., token) to the analytics server that may include a customer identifier (CID). The CID may be a unique identifier associated with the customer, which may be utilized to recognize the customer. For instance, the customer may have provided a login token (e.g., name, CID, email address, phone number, mailing address, other personally identifiable information, web authentication ID or Face ID, and/or any other biometric authentication data, such as fingerprint data) when generating a customer profile associated with the analytics server (e.g., using the application). The login token may be encrypted, such that the sensitive data may not be inappropriately accessed.

The CID may also refer to a unique identifier of the customer device, such as an IP address, MAC address, or any other identifier associated with the customer device. The analytics server may use this information to identify an account of the customer, which may include payment information, recent purchases, credentials, authorized communication channels and devices, saved preferences, and other information (e.g., payment information, size, color, and style preferences determined based on previous purchases and customer inputs).

Using the CID, the analytics server may access the customer profile to identify customer preferences. The analytics server may continuously monitor the online activity of the customer and store the corresponding data within the customer profile. For instance, the customer profile may include a list of products purchased, searched, or viewed by the customer. In some configurations, the analytics server may augment the data within the customer profile using other third-party data, such as cookies.

At step 1204, the analytics server may obtain a 3D model of a product that corresponds to the first surface, wherein the correspondence of the product to the surface is based at least in part on a type of the first surface. The analytics server may identify a product that corresponds to the identified surface. After identifying one or more surfaces within the camera feed, the analytics server may use customer preferences (retrieved from the customer profile) to recommend one or more products for the customer. The recommended products may also be suitable in accordance with one or more attributes of the identified surface (e.g., a type of the identified surface). For instance, if the analytics server identifies a horizontal surface, the analytics server further analyzes the surface to determine whether the horizontal surface belongs to a couch, table, or chair. The analytics server may then query a database to identify one or more products that correspond to (i) the identified customer preferences and (ii) identified surface.

In a non-limiting example, when the analytics server identifies that the horizontal surface belongs to a table (not a couch), the analytics server queries for products that could be placed on the table. The analytics server may then use a dimensionality attribute to filter the retrieved products (e.g., eliminate products that would not fit on the table). The analytics server may then use various rules to filter the remaining products by what is suitable for the identified table. For instance, the analytics server may determine that a television is not suitable to be placed on a dining table. In contrast, the analytics server may determine that a vase or a picture frame is a suitable product to be placed on the dining table. The analytics server may then filter the remaining items by the customer's preferences. For instance, the analytics server may determine that the customer is interested in vases and not picture frames.

At step 1206, the analytics server may provide an augmented media containing an overlay of a first AR representation of the 3D model of the product in the first view. The analytics server may generate an AR layer containing a first AR representation of the product on the surface in the first view.

After identifying one or more products, the analytics server may display an augmented media element (also referred to as an AR layer) that contains a representation of a 3D model of the product fit within the camera feed, as presented on the customer's device. As discussed herein, the augmented media may be a representation of the camera feed (e.g., real-world images) that has been combined with a rendering or a representation of the obtained 3D model, such as described and depicted in FIGS. 4-11.

In an embodiment, the analytics server may first retrieve a 3D model that corresponds to the product identified in step 1204. 3D models (e.g., virtual models that depict a particular product and include various attributes of the product, such as product details and dimensionality) may be pre-configured and stored within a data repository (e.g., product catalog) accessible to the analytics server. For instance, the 3D models may be generated by developers in the design phase before being stored in the data repository to ensure that they maintain their real-life use and orientation. Upon identifying the products, the analytics server may retrieve corresponding 3D models associated with the identified products.

Using the methods and systems discussed herein, the analytics server may display a representation (e.g., rendering) of the retrieved 3D model as an additional layer to the camera feed that is displayed on the customer device.

In some configurations, the analytics server may provide the option for the customer to dynamically change the product depicted as the AR layer. For instance, the analytics server may display an AR-supported product catalog. As used herein, the AR-supported product catalog may refer to a list of products that can be displayed as an additional AR layer to the camera feed. The catalog may include different possible products to be selected by the customer. The customer may browse through product catalogs from any number of online retailers that have enabled support for 3D model(s) of product(s). The products in the catalog may be sorted into any number of different product categories, e.g., the product catalog may contain models for tables, tablecloths, chairs, rugs, wall paintings, ceiling fixtures, etc. Alternatively, instead of browsing, a customer may choose to accept suggestions from a product recommendation engine, whereby a product recommendation engine uses the CID to recommend a product to the customer (e.g., factors such as a customer's purchasing history, browsing history, customer-specified keywords, specified product categories, trending products or other customer preferences and settings such as wish-lists, color preferences, furniture dimensions).

Additionally or alternatively, the product recommendation engine may dynamically recommend suitable products based on real or AR objects present in the space. For instance, the analytics server may determine one or more existing items/objects on a dining table. Specifically, the analytics server may determine that the dining table already includes a vase. As a result, the analytics server may not recommend an additional vase to be placed on the dining table. Instead, the analytics server may recommend a picture frame to be placed on the table. When the analytics server identifies multiple surfaces suitable for multiple different products, the analytics server may confirm the desired surface with the customer.

At step 1208, the analytics server may, responsive to the processor identifying a second surface in a second view of the camera feed from the customer device, revise the augmented media to contain a second AR representation of the 3D model of the product on the second surface in the second view.

The analytics server may continuously monitor the camera feed received via the customer device. When the analytics server determines a new surface associated with the camera feed, the analytics server may display a second AR representation of the product. The second AR representation of the product may include a virtual depiction of the first product displayed and step 1206. However, the second AR representation may include a different configuration or size associated with the product. In a non-limiting example, the second AR representation may include a different arrangement or size of the same product virtually depicted in step 1206. In this way, the analytics server ensures that the AR representation of the recommended products is dynamically updated, such that they are always suitable for the surface within the customer's camera feed.

In an example, a customer is browsing through the product catalog of an online store that sells home decor. The customer then clicks on the product page for a set of picture frames. The customer then indicates a desire to view an AR representation of picture frames, for example, by saving the picture frames using the application (merchant application or an application provided by the analytics server). The customer can save multiple virtual products using the above-described method. Alternatively, the customer can request a product recommendation. When the customer requests the application to recommend a product, the analytics server identifies a product to be displayed based on the customer's profile and the surfaces surrounding the customer. As a result, the analytics server identifies one or more suitable products for the customer (based on the customer's preferences and the identified surfaces).

After selecting a product to be viewed or requesting the analytics server to recommend a product, the customer clicks on "AR View" (displayed on the application). As a result, the application (via receiving instructions from the analytics server) activates a camera of the customer device and displays the camera feed.

Figure 13A:
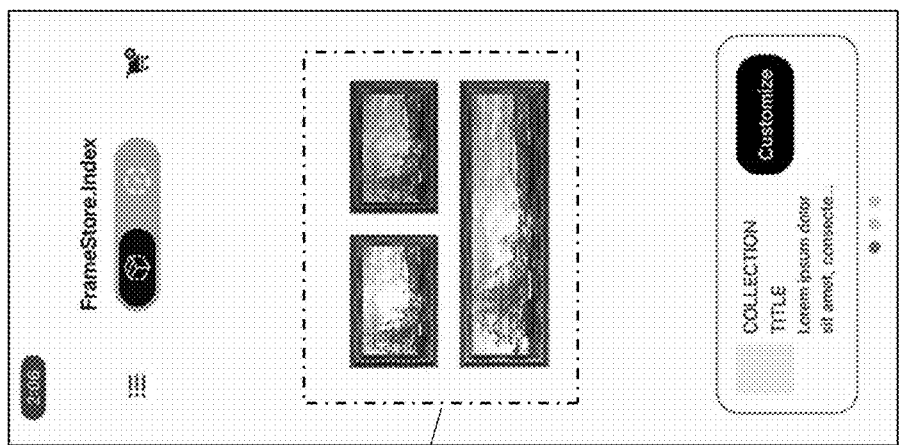
FIGS. 13A-13H show examples of dynamic revisions of graphical user interfaces by a dynamic product presentation system, according to various embodiments.
Figure 13B:
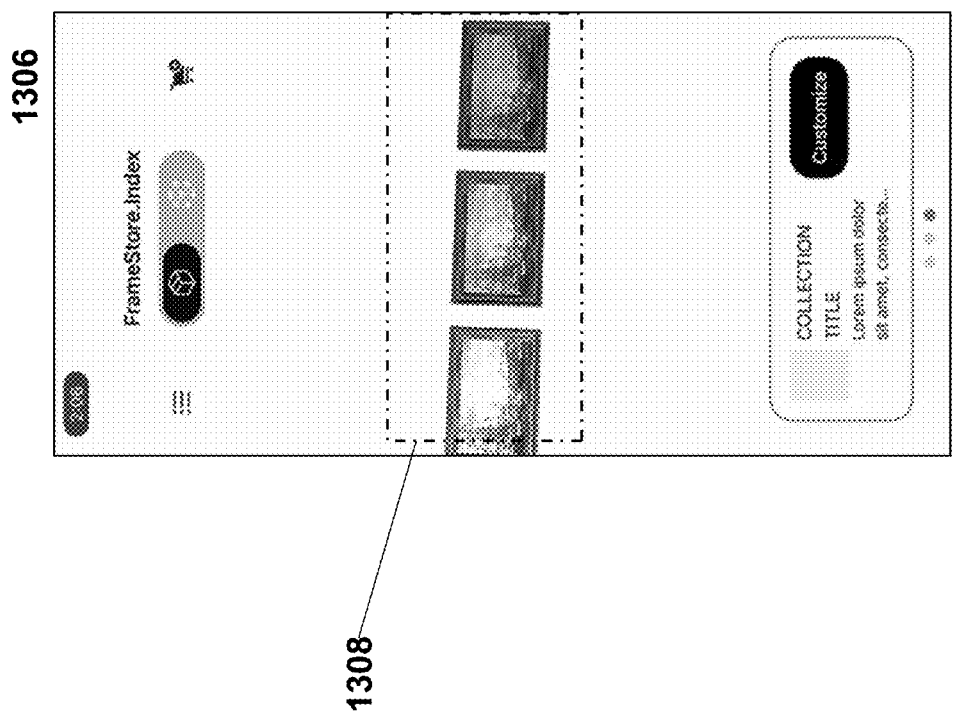
Figure 13C:
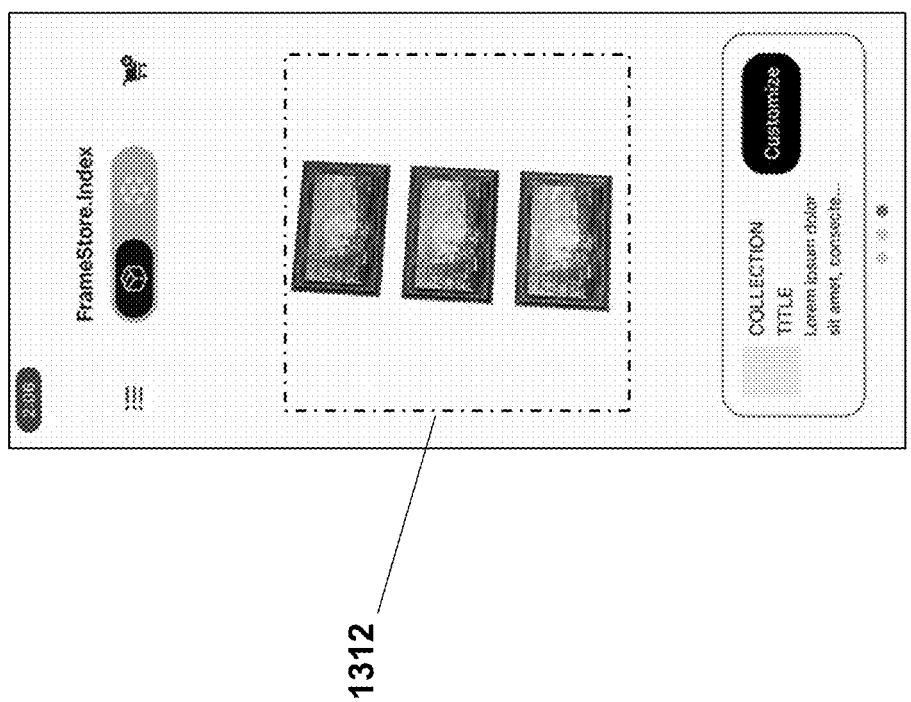
Figure 13D:
Figure 13E:
Figure 13F:
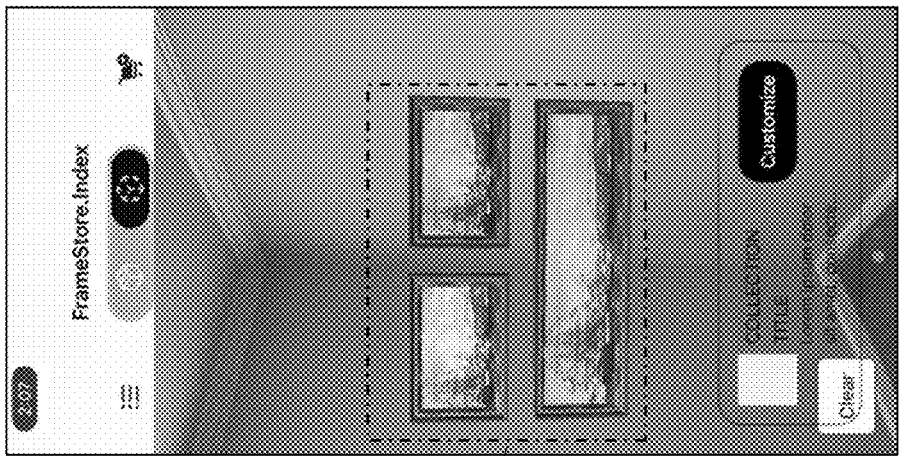
Figure 13G:
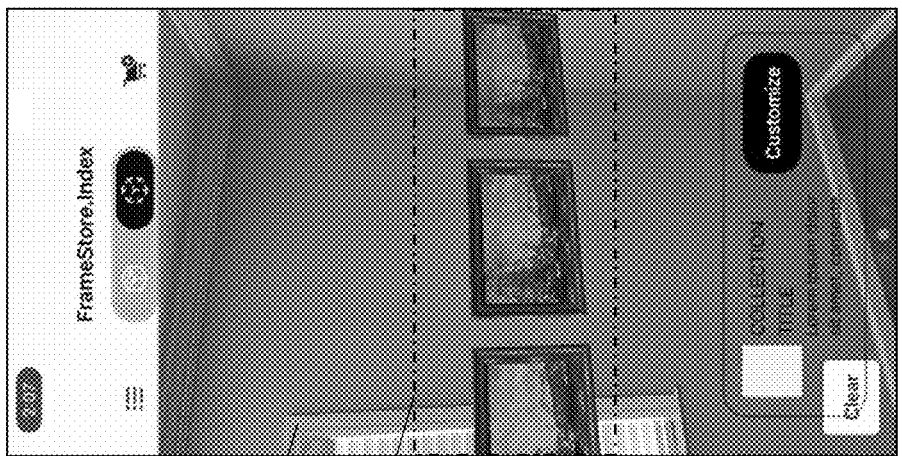
Figure 13H:
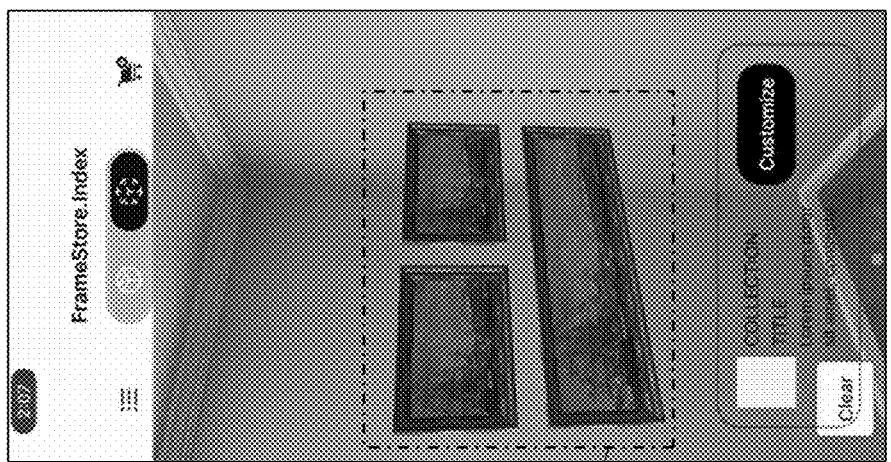

For instance, as depicted in FIGS. 13A-C, the customer selects the picture frames. As depicted, the picture frames can be arranged in different configurations, such as the GUI 1302 (picture frames 1304), GUI 1306 (picture frames 1308), and GUI 1310 (picture frames 1312). When the customer points the camera at a surface that is suitable for the selected product, the analytics server displays an AR representation of the product. For instance, as depicted in FIG. 13D (augmented media 1314), when the camera of the customer device is facing a wall (e.g., the camera feed includes a wall having a surface that can fit the set of pictures), the analytics server displays the graphical element 1315. When the analytics server determines that the customer has interacted with a portion of the wall, the analytics server displays the AR representation 1316 of the picture frames on the wall.

The analytics server may allow the customer to customize the configuration of the picture frames. For instance, as depicted in the augmented media 1318, the customer may change the orientation of the picture frames (e.g., AR representation 1320 instead of 1315).

Unless the customer requests, the AR representation 1316 may not be anchored to a specific location. As a result, the customer may move the camera feed and the analytics server may display a corresponding AR representation of the picture frames. For instance, the customer may move and change the camera feed, as depicted in the augmented media 1326 or the augmented media 1330. However, this movement may create an inconsistency with the AR representation of the picture frames. For instance, the AR representation 1328 (depicted in the augmented media 1326 that corresponds to the AR representation 1320) or the 3D representation 1332 (depicted in the augmented media 1330 that corresponds to the AR representation 1316) are no longer suitable for the depicted surfaces (after the camera is moved). Specifically, depicted orientation of the picture frames (1332) is no longer suitable because the picture frames (as depicted) interfere with an adjacent wall and the windows 1334. As a result, the analytics server reconfigures the AR representation 1332 to the AR representation 1338 depicted in the augmented media 1336. As depicted, the new configuration does not interfere with the window or the adjacent walls because the analytics server has changed the configuration.

In other embodiments, the analytics server may change the size of the picture frames. For instance, the analytics server may recommend that the customer purchases smaller frames if the customer is interested in purchasing frames for that particular wall. In some configurations, the analytics server may change the orientation of the frames (e.g., recommend two horizontal frames and one vertical frame).

The analytics server may also provide the customer the option to purchase the (virtually) displayed product. For instance, the analytics server may display an interactive button that is configured to receive a request by the customer to purchase the depicted set of picture frames. When the analytics server receives an indication that the customer has interacted with the interactive button, the analytics server transmits attributes of the product selected by the customer to the merchant. The analytics server may also initiate a checkout process and may direct the customer (e.g., the application executing on the customer device) to a checkout page.

The analytics server may also allow a direct purchase while the AR representation is being displayed. The analytics server may allow customers to bypass interacting with the merchant and may expedite the purchase using the customer's existing information (e.g., the customer is only required to confirm the transaction and is not directed to the merchant's website or required to input payment or shipping information).

In some embodiments, the customer may use an anchoring point to change the representation of the product from one surface to another. For instance, the customer may first anchor a representation of a product to a first surface (e.g., surface shown in the augmented media 1314). The customer may then revise the anchor to a second surface (e.g., surface shown in the augmented media 1330). Accordingly, the analytics server may reconfigure the picture frames, such that they are secured against the second surface.

Additionally or alternatively, the analytics server may allow customers to select a placement for the AR representation of a product. For instance, a customer may tap on their device screen (or otherwise interact with a surface depicted) to identify where they want to place the anchoring point. Once a customer is satisfied with the position of the, they may confirm its placement (e.g., by tapping "Place") and the analytics server may display the AR layer.

The analytics server may display a graphical indicator corresponding to an anchoring point for placement of the AR representation of the product. When the customer interacts with the anchoring point or when the customer places the anchoring point on a particular surface, the analytics server may recommend one or more items for that particular surface.

The customer may be able to view their surroundings from the point of view of their device's rear-view camera. When a surface (within the customer's view) is detected, the analytics server assigns and displays an anchoring point associated with the surface. When the customer moves their device such that the camera's view pans along a new detected surface, the position of the anchoring point may update to remain in the center of the field of view. One or more 3D models, for products that are suitable for the surface in the field of view, are then displayed as if they have been virtually anchored to the anchoring point. The analytics server may ensure that the 3D model(s) corresponding to the product that is being displayed on the customer's device has a center of rotation that corresponds to the anchoring point. As a result, the customer may continue to explore alternative placements for the AR depiction of the product along the surface in the field of view by panning their device along the plane, thereby updating the position of the anchoring point and the affixed AR representation of the corresponding 3D model.

In an embodiment, the analytics server may only reconfigure the picture frames when the second surface types matches the first surface type. For instance, the analytics server determines that the surface depicted within the augmented media 1314 is a wall. When the analytics server identifies that the customer device has been moved and the camera feed includes a second surface, the analytics server may identify a type of surface for the second surface. For instance, the analytics server determines that the surface identified within the augmented media 1130 is also a wall. Because the first surface has a type that matches the second surface type, the analytics server may continue displaying the picture frames (e.g., picture frame is a suitable product for both surface types).

Alternatively, if the analytics server determines that a surface type within the second view (e.g., after the customer device has been moved or when the camera feed includes a different surface) has a different type, the analytics server may either stop displaying the AR representation of the product (3D model) or may change the AR representation to another product that matches the new surface type. For instance, when the analytics server determines that the camera is pointed towards a table, the analytics server may stop the AR presentation of the picture frames. Instead, the analytics server may start presenting a new product (e.g., table top picture frames instead of wall picture frames).

Figure 14A:
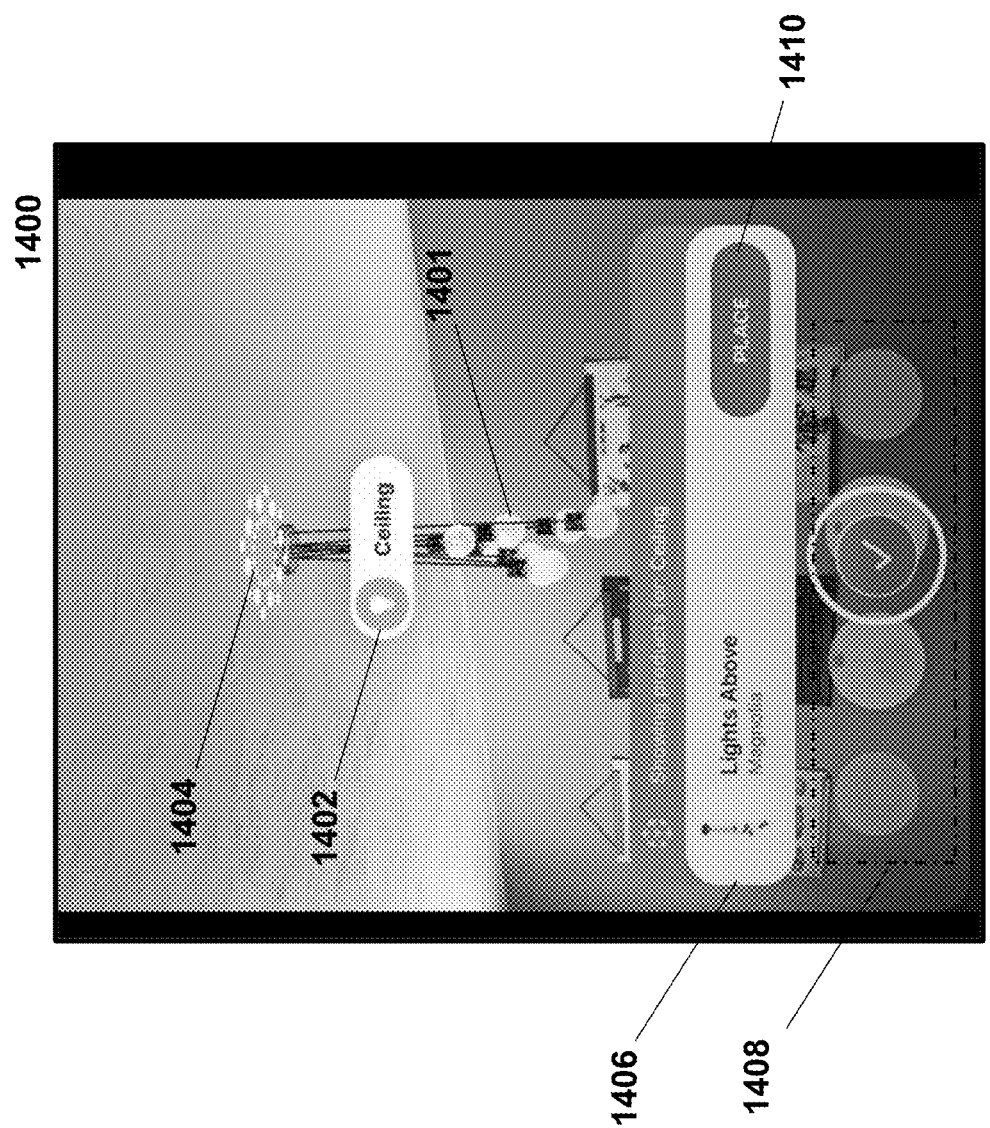
FIGS. 14A-14C show examples of dynamic revisions of graphical user interfaces by a dynamic product presentation system, according to various embodiments.
Figure 14B:
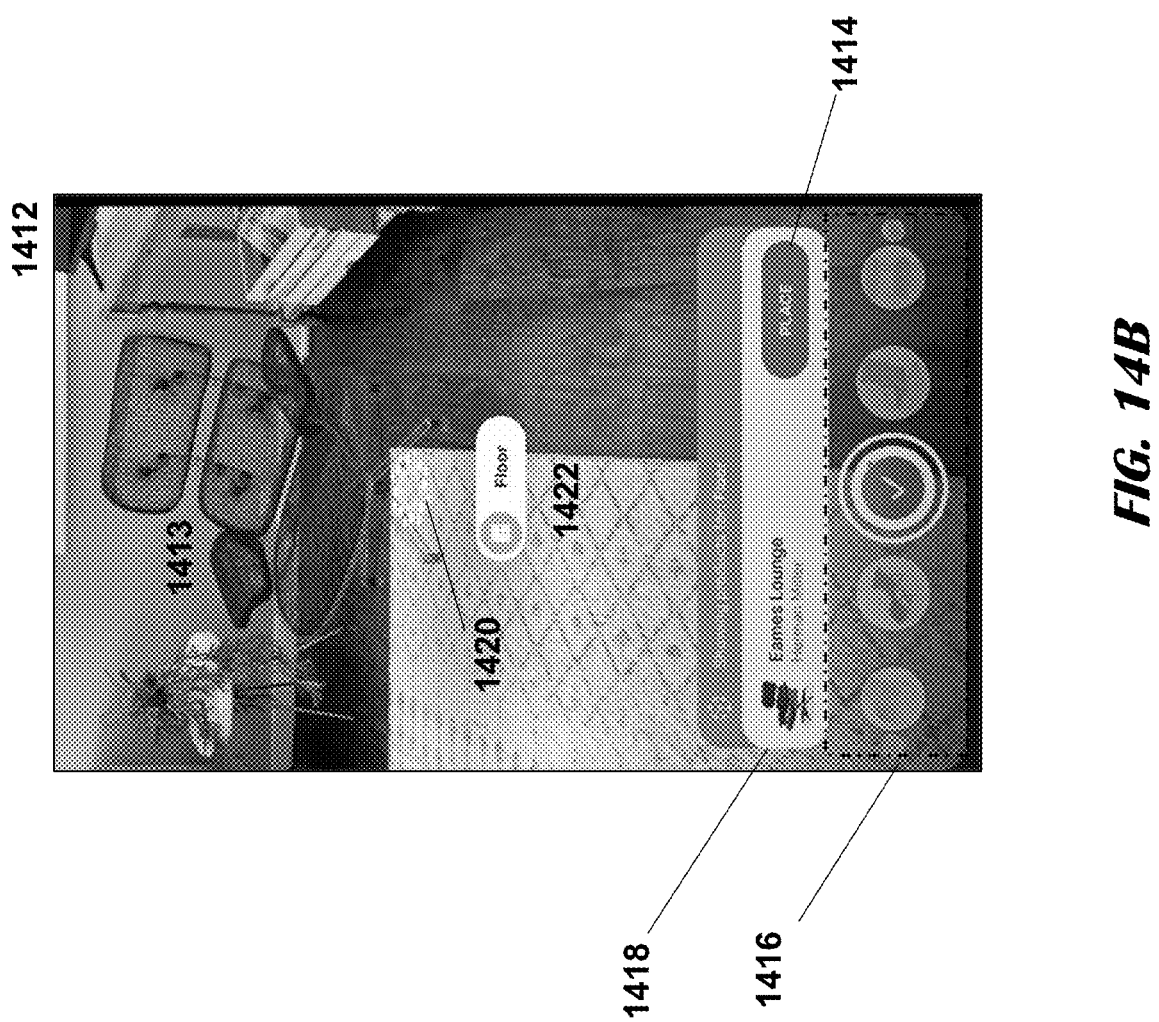
Figure 14C:
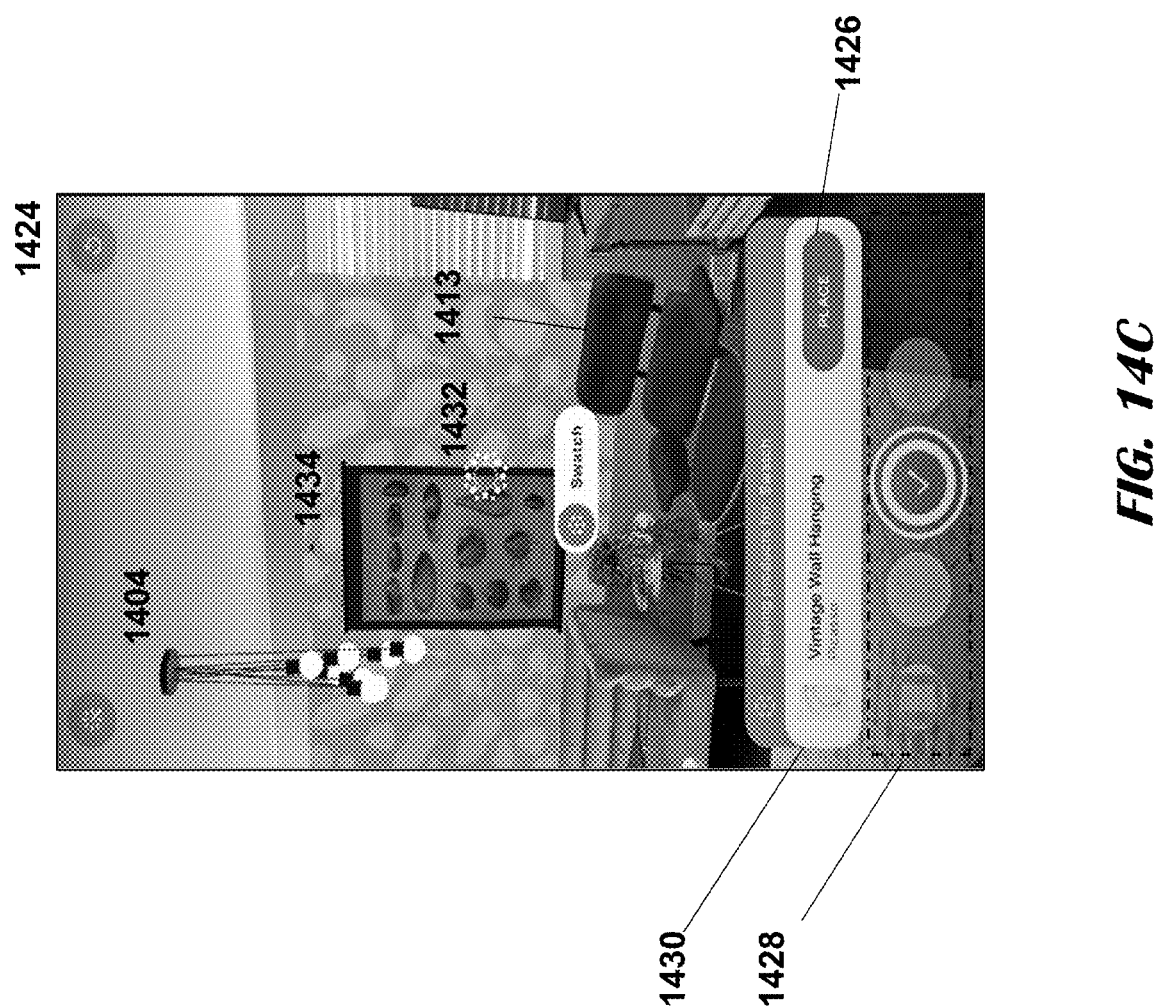

FIGS. 14A-C illustrate various examples of customizing an augmented media (e.g., an AR representation of a product as an additional layer to a camera feed). The augmented media 1400 depicts a camera feed received from a customer device. Specifically, the camera feed shows a portion of a room in which the customer is located. The camera feed includes parts of the ceiling and the wall of the room in which the customer is located. Upon receiving the camera feed, the analytics server uses various methods discussed herein to identify the ceiling and the wall (corresponding surfaces). Thereafter, the analytics server may display the graphical indicator 1402 indicating that the analytics server has identified the ceiling. The analytics server may also display the anchoring point 1404 indicating the location of a possible anchoring point for a product to be virtually placed.

The analytics server may also display the graphical element 1406 that describes the product to be displayed. Specifically, the graphical element 1406 informs the customer that the analytics server has selected a chandelier to be displayed on the customer's ceiling. The customer may revise the anchoring point by interacting with the anchoring point 1404. For instance, the customer may move the anchoring point to a different location of the ceiling by moving the anchoring point 1404. When the customer is satisfied with the location of the anchoring point, the customer may interact with the interactive button 1410 to place a chandelier over or centered on the anchoring point 1404. As a result, the analytics server may retrieve a 3D model of the chandelier that has been selected for the customer and the customer's identified surface. The analytics server may then display the AR layer 1401 (corresponding to an AR representation of a 3D model of the depicted chandelier) that displays a chandelier as an additional layer to the camera feed displayed in the augmented media 1400. The analytics server may optionally display the catalog 1408 allowing the customer to scroll through different chandeliers (e.g., different types and colors of chandeliers) or different products to be virtually placed on the customer's ceiling.

Another example of recommending products based on identifying a customer's surroundings is displayed in FIG. 14B. As depicted, the augmented media 1412 displays another camera feed associated with the customer device. When the customer moves their customer device and focuses on a different part of the room, the analytics server may dynamically recognize new surfaces within the new camera feed. For instance, the analytics server identifies that the camera feed is now facing the floor. As a result, the analytics server displays the anchoring point 1420 and the graphical indicator 1422 to indicate that the analytics server has identified the floor and is recommending products specific to the identified surface.

The analytics server displays the catalog 1416 and the graphical element 1418 that allow the customer to browse through various products to be virtually placed in the customer's room. When the customer interacts with the interactive button 1414, the analytics server may display an AR layer depicting the virtual chair 1413 (an AR representation of a 3D model of the chair) on or centered on the anchoring point 1420.

The analytics server may track the position of all 3D models placed in the scene (e.g., displayed as an additional layer to the camera feed). When a model's placement is confirmed, the analytics server may log the location of the object relative to the customer's device and the detected plane. When decorating the room with multiple virtual products, a customer may temporarily move their device to a new surface or corner of the room, such that a previously placed model is no longer in the field of view of the camera. However, as the location of the 3D models is recorded, such that their position in the room can be maintained so that when the customer pans the camera back to the location of a previously placed model, the analytics server displays the virtual product as before.

For instance, as depicted in FIG. 14A, the customer has anchored the virtual chandelier to its anchoring point 1404. Furthermore, as depicted in FIG. 14B, the customer has moved the camera to a different part of the same room and has placed the virtual chair 1413 to the anchoring point 1420. The analytics server may track the position of these virtual objects. As a result, and as depicted in FIG. 14C, when the customer moves to a location where both the ceiling and the floor are visible (augmented media 1424), the analytics server may virtually place the virtual chandelier attached to the anchoring point 1404 and the virtual chair 1413.

Additionally, the analytics server may identify and recommend a product for the wall using the new view of the camera feed depicted in the augmented media 1424. Specifically, the analytics server may display the catalog 1428 and the graphical element 1430 along with the anchoring point 1432. When the customer interacts with the interactive button 1426, the analytics server may place the virtual vintage wall hanging 1434 (a representation of a 3D model of the vintage wall hanging) on or around the anchoring point 1432.

To provide a realistic AR presentation, the analytics server may require information about which side(s) of a 3D model of a product to affix to the real-life surface(s) in an AR view so that the placement of the model reflects real-life use and orientation of the product. This information may be supplied beforehand by developers as configuration options for each 3D model. For instance, the 3D model may include this configuration information, such that the analytics server can display a more realistic version of the product. Configuration options may include (i) defining possible contact surfaces available on the model, (ii) defining allowable orientations (e.g., restricting rotations on x-axis, y-axis, or z-axis to realistic positions), and defining suitable surfaces (e.g., restricting the placement of a tablecloth to a table rather than an alternative horizontally oriented surface like the floor or ceiling). Additionally or alternatively, the analytics server may employ machine learning algorithms and models to automatically set configuration options for a given 3D model.

Figure 15:
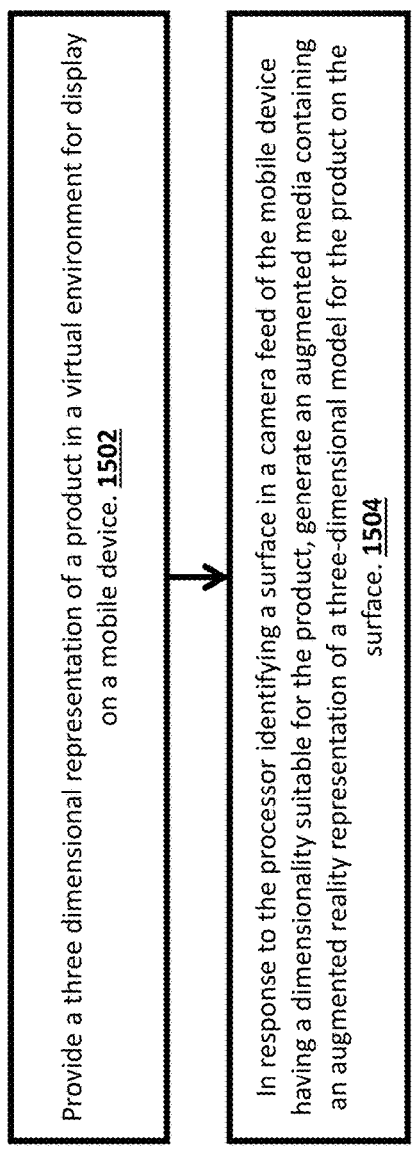
FIG. 15 shows execution steps for a dynamic product presentation system, according to an embodiment.

FIG. 15 illustrates a flowchart depicting operational steps for a dynamic product presentation system, in accordance with an embodiment. The method 1500 describes how a server, such as the analytics server described in FIG. 3, can dynamically revise a GUI presenting a product based on a customer's surroundings.

Even though the method 1500 is described as being executed by the analytics server, the method 1500 can be executed by any server and/or locally within a customer's trusted device (e.g., the customer device discussed in FIG. 3 or FIG. 9). Additionally or alternatively a server can execute the method 1500 in other computer environments (other than the environments depicted in FIGS. 1-11). For instance, the method 1500 can be executed by a server providing SaaS in a non-commerce infrastructure for any electronic platform.

Additionally or alternatively, the method 1500 may be executed by a web server hosting a page (e.g., a website associated with the merchant's online store or content for a mobile application) and executing various revision methods described herein. Additionally or alternatively, the method 1500 may be executed by a server hosting an application configured to display a page (or a GUI) associated with the merchant's online store and acting as the analytics server by executing various revision methods described herein. Furthermore, other configurations of the method 1500 may comprise additional or alternative steps or may omit one or more steps altogether.

At step 1502, the analytics server may provide a 3D representation of a product in a virtual environment for display on a customer device. The analytics server may display a 3D representation of a product in a virtual environment for a customer via the application or any other GUI. As described herein, the customer may select one or more products to view and may view them using the method 1200 discussed herein. However, the customer's surroundings may not be suitable for an AR presentation. For instance, the customer may be in a dark room or a room without a surface suitable for the selected product's AR presentation. As a result, the analytics server may provide a media element depicting the product (e.g., 3D representation of the product in a virtual environment).

As used herein, a virtual environment may refer to any environment that is generated by the analytics server (or a third party) in which a rendering or representation of a product can be placed. For instance, the virtual environment may be a 3D model or an image of a room including walls and other objects, such as table(s), chair(s), and the like. As described herein, the virtual environment may be a default environment (e.g., generic room) or customized per the customer's instructions. For instance, a customer can place a table (having certain attributes, such as size and color) within their customized virtual environment. The analytics server may then place a rendering of a product (e.g., vase) on the table within the customized virtual environment. In some configurations, the analytics server may customize the virtual environment using various images received from the customer (e.g., camera feed of the customer device). As a result, the virtual environment may resemble the customer's room or any other space defined by the customer. Therefore, as used herein, the virtual environment is different from augmented media that is used to provide AR presentation of a product (e.g., a combination of real-world images and an AR rendering of a product), though the virtual environment may be generated based on real-world images.

In some configurations, the media element may be an image of the product that is customizable based on one or more attributes received from the customer. For instance, the media element may be an image of a table where the attributes of the table (e.g., size, color, and style) and the table's surroundings (e.g., the virtual environment in which the table is depicted) can be customized by the customer. In a non-limiting example, the table can be placed in a room having attributes that can be customized by the customer.

In other configurations, the 3D representation of the product may be an animation (e.g., video file) depicting the product within a defined space (virtual environment). In some configurations, the 3D representation of the product may display the product within a virtual environment (e.g., defined structure) that is customizable based on customer inputs or other attributes. For instance, the 3D representation may depict the product within a virtual room that resembles a room defined by the customer, such as the customer's actual surroundings or a defined area/structure. The analytics server may construct a virtual environment that includes a 3D representation of the customer's room, house, or any other structure identified by the customer (e.g., the customer's parent's house). The customer may allow the analytics server to capture the camera feed associated with the customer's room and to generate the virtual environment using methods discussed herein (e.g., the methods 1000 and 1100).

In some configurations, the analytics server may monitor the customer's camera feed and gradually generate a 3D model that resembles the customer's room. The customer may then assign a location and name to the virtual environment, such that the customer can later instruct the analytics server to depict the product within a particular virtual environment (e.g., virtual living room or virtual bedroom).

When depicting a product, the analytics server may retrieve a 3D representation of the product within a defined virtual environment (e.g., either selected by the customer or a default/generic virtual environment). The virtual environment may be pre-generated and/or customized by the customer. Alternatively, the virtual environment may be generated for displaying a particular product upon receiving a request from the customer. The virtual environment may include one or more surfaces that are suitable for the product. For instance, the customer may see a computer-generated wall. In another example, the virtual environment may include several 3D objects (e.g., the customer may be presented with a view of a living room containing 3D models of a couch and a coffee table).

In a non-limiting example, given that a customer clicks on the option to view a wall painting in AR, the analytics server may first run the surface detection algorithm in the background. If the analytics server identifies a suitable surface, the analytics server may use the methods and systems described herein to display an AR representation of the product. However, upon finding that either no surfaces were detected or no detected surfaces were walls (only horizontally oriented planes detected), the analytics server may generate a 3D scene (virtual environment) containing a wall upon which the wall painting may be overlaid.

The virtual environment may have one or more attributes that resemble a defined space or have been customized by the customer. The customer may navigate around the 3D scene by using finger gestures on their device screen (e.g., pinching outwards to zoom in or pinching inwards to zoom out of a painting, or panning across the 3D wall by swiping across the screen with one finger). Additionally, the analytics server may incorporate the device's IMU data to allow a user to view the 3D surface from different angles by tilting their phone. The virtual environment may be model-specific. For instance, the analytics server may only generate the 3D wall if the customer is exploring wall paintings or may only generate a dining table and chairs within the virtual environment if a customer is exploring china sets.

At step 1504, the analytics server may, responsive to the processor identifying a surface in a camera feed of the customer device having a dimensionality suitable for the product, generate an augmented media containing an AR representation of a 3D model for the product on the surface. While the analytics server is displaying the 3D representation of the product, the analytics server may continuously or periodically monitor a camera feed associated with the customer's device. The analytics server may have previously received authorization from the customer to use and analyze the customer's camera feed (e.g., images and video captured by the customer device) as a background process. The analytics may periodically use various methods discussed herein to identify whether the camera feed includes a surface that is suitable for the AR representation of the product instead of the 3D representation being currently outputted for the customer. Specifically, the analytics server may use the methods and systems discussed in FIGS. 3-12 to determine whether the customer (the customer device) is facing a surface on which the analytics server can display the 3D representation of the product as an additional layer. The identified surface must be a surface that is configured for the product. For instance, the surface must have the dimensionality to fit the product (e.g., a wall must be big enough for a painting). The surface must also have a type/category that is suitable for the product. For instance, a surface of a wall is identified for a painting, a table top is identified for a table top picture frame, and the like).

When the analytics server identifies a suitable surface, the analytics server may switch from the 3D representation of the product to an AR presentation of the product. The AR presentation or the AR view refers to the analytics server generating and presenting an augmented media that includes a representation of the 3D model of the product and not the 3D presentation of the product in the virtual environment.

The analytics server may either automatically change the presentation to an AR presentation. Alternatively, the analytics server may display a graphical indicator or an input element informing the customer that an AR view is also possible. The analytics server may then switch to an AR view when the analytics server receives an indication that the customer has authorized or requested an AR presentation instead of the 3D representation of the product in a virtual environment.

In some configurations, when an IMU of the customer device indicates that the customer has changed the orientation of their device such that the device is pointed at a surface not suited for the model currently being viewed, the analytics server may transition back to presenting the virtual environment. For example, when a customer looking at a wall painting in AR points the customer device in a downward-facing direction (e.g., to be in a more comfortable position while adjusting settings), the analytics server may transition back to the virtual environment. In another example, when the same customer moves outdoors (while viewing AR presentation of wall painting), the analytics server may switch to the virtual environment (because the analytics server does not detect any walls to overlay the model on).

In another example, the analytics server may switch back to the virtual environment if the customer switches to a second/next product in a queue of products (e.g., within a product catalog) and the new product 3D model is not suitable for placement on the same surface. For example, a customer may be considering a wall painting and a new rug.

While viewing the wall painting in AR, they may tap the icon for the rug in the navigation bar. As the rug cannot be placed on the surface the customer is currency pointing at (the wall), the analytics server transitions to a virtual environment until the customer reorients their device to point at the floor.

Customers may be presented with several options to configure their viewing experience. In a first non-limiting example, the analytics server may provide toggling on/off auto-transition. When the toggle is switched off, the analytics server will not automatically dissolve the 3D presentation when an appropriate surface is detected in the field of view of the device's camera. In a second non-limiting example, the customer may manually adjust the lighting settings for the virtual environment or may opt to mimic the lighting settings detected in their current surroundings.

In some configurations, the analytics server may display a portion of the camera feed (in real time) for the customer. When the analytics server may change an attribute of the displayed portion of the camera feed. The customer may interact with the displayed portion of the camera feed to switch to the AR mode. For instance, as the customer is viewing the 3D representation of a chair, a portion of the screen may display the camera feed in real time. However, the camera feed may be in black and white. When the analytics server identifies a suitable surface, the color of the camera feed may change (no longer in black and white). The customer may swipe towards or away from the camera feed (or otherwise interact with the camera feed, such as by clicking on it) to switch to AR mode.

In a third non-limiting example, the customer may adjust various attributes of the virtual environment (e.g., color, texture, or pattern of various surfaces within the virtual environment) manually or allow the analytics server to automatically adjust these parameters based on analysis of the customer's surroundings. For instance, the customer may point at a wall and the analytics server may derive the color, texture, and pattern of the surface and use these attributes to automatically adjust the virtual environment. In a fourth non-limiting example, when transitioning from the 3D representation to the AR representation, the analytics server may gradually transition from one view to another to provide an aesthetically pleasing transition for the customer.

As shown in FIGS. 16A-16D, a customer may access an application (e.g., provided by the analytics server) to view a previously selected product (e.g., picture frame). The application may then display the augmented media 1600 that includes a 3D representation of the product 1602. The 3D representation may depict the product 1602 on a wall that matches the characteristics (e.g., color) of the customer's bedroom walls. In this way, the customer may easily visualize the picture frame in their bedroom. The customer may also interact with the displayed 3D representation by zooming in and out or changing the viewing angle (e.g., rotate the product).

The GUI 1600 may also include the toggle 1604 that allows the customer to switch between a standard view of the product 1602 (e.g., an image of the product 1602 provided by the merchant), studio representation of the product 1602 (e.g., 3D representation of the product 1602), or an AR representation of the product 1602. In some configurations, different presentation methods may not be interactive unless that particular presentation is available. For instance, the "AR" button may be inactive until and unless AR presentation of the product 1602 is possible.

Additionally or alternatively, a portion of the GUI 1600 may display a camera feed associated with the customer device (in real-time or near real-time). For instance, the GUI 1600 may include a graphical element 1628 that displays a camera feed received from the customer device. In some configurations, the displayed camera feed may be in black and white. When the analytics server identifies a suitable surface (when AR view is possible), the color of the camera feed may change (e.g., camera feed may be displayed with colors). Upon receiving an indication that the customer has interacted with the graphical element 1628, the analytics server may switch to the AR representation (e.g., FIGS. 16C-D) and expand the graphical element 1628 to occupy more or even all of the display.

Using different features displayed within the GUI 1600, the customer may be able to customize the product 1602. For instance, the GUI 1600 may include the graphical element 1606 that includes different picture frame colors and picture patterns. The customer may change different attributes of the depicted product 1602 using the options displayed within the graphical element 1606. For instance, the customer may change the picture frame color, as depicted in the product 1610 (augmented media 1608). The customer may interact with the graphical element 1606 to change various attributes (color and/or the displayed picture within the picture frame).

Figure 16D:
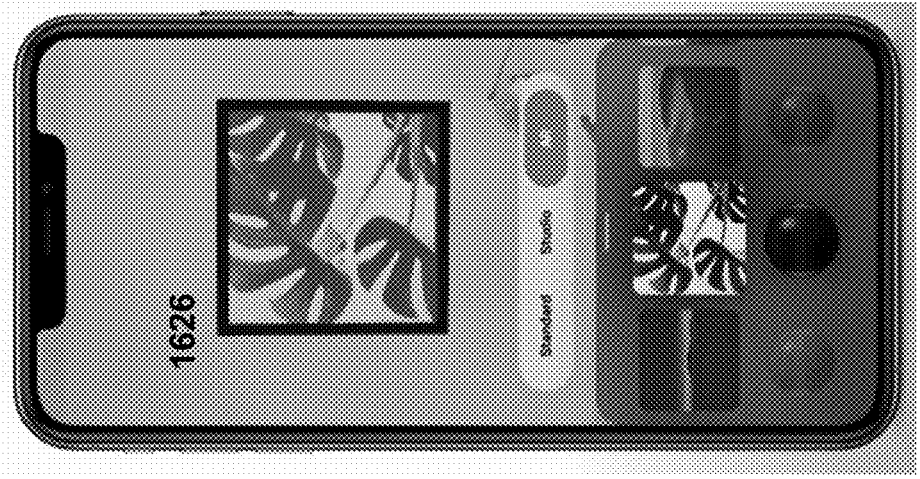

When the AR presentation of the product 1610 is feasible, the analytics server may switch to the AR mode and may highlight the "AR" in the toggle 1620. The analytics server may also change the method of display of the product 1618. For instance, the analytics server may switch to displaying an AR representation of the product 1618 (augmented media 1616). The customer may still customize the product (even in AR mode) by interacting with the graphical element 1622. For instance, the customer may change the depicted picture within the picture frame, as depicted in FIG. 16D (product 1626 depicted in augmented media 1624).

In an embodiment, a method comprises identifying, by a processor, a first surface in a first view of a camera feed from a customer device; obtaining, by the processor, a three-dimensional model of a product that corresponds to the first surface, wherein the correspondence of the product to the surface is based at least in part on a type of the first surface; providing, by the processor, an augmented media containing an overlay of a first augmented reality representation of the three-dimensional model of the product in the first view; and responsive to the processor identifying a second surface in a second view of the camera feed from the customer device, revising, by the processor, the augmented media to contain a second augmented reality representation of the three-dimensional model of the product on the second surface in the second view.

The second augmented reality representation of the three-dimensional model may be a different size than the first augmented reality representation of the three-dimensional model.

The second augmented reality representation of the three-dimensional model may be a different configuration than the first augmented reality representation of the three-dimensional model.

The second augmented reality representation of the three-dimensional model may be a different orientation than the first augmented reality representation of the three-dimensional model.

The processor may revise the augmented media responsive to determining that a second type of the second surface matches the type of the first surface.

The processor may also, responsive to identifying a third surface in the second view of the camera feed from the customer device where the third surface has a second type of surface not suitable for the three-dimensional model, revise the augmented media to contain a third augmented reality representation of a second three-dimensional model of a second product on the third surface in the second view.

The first augmented reality representation of the product may be positioned on the first surface based on a first anchoring point; and the method may further comprise identifying, by the processor, a change from the first anchoring point on the first surface to a second anchoring point on the first surface, and in response, repositioning, by the processor, the first augmented reality representation on the first surface based on the second anchoring point.

The first augmented reality representation of the product may be positioned on the first surface based on a first anchoring point; and the method may further comprise identifying, by the processor, a change from the first anchoring point on the first surface to a second anchoring point on the second surface, and in response, repositioning, by the processor, the first augmented reality representation on the second surface based on the second anchoring point.

The method may further comprise positioning, by the processor, at least one of the first augmented reality representation or the second augmented reality representation based on an anchoring point.

The product may have an attribute that matches a customer preference within a customer profile associated with the customer device.

The product may have an attribute that corresponds to an object identified within the camera feed.

In another embodiment, a machine-readable storage medium has computer-executable instructions stored thereon that, when executed by one or more processors, cause the one or more processors to perform operations comprising identifying a first surface in a first view of a camera feed from a customer device; obtaining a three-dimensional model of a product that corresponds to the first surface, wherein the correspondence of the product to the surface is based at least in part on a type of the first surface; providing an augmented media containing an overlay of a first augmented reality representation of the three-dimensional model of the product in the first view; and responsive to identifying a second surface in a second view of the camera feed from the customer device, revising the augmented media to contain a second augmented reality representation of the three-dimensional model of the product on the second surface in the second view.

The second augmented reality representation of the three-dimensional model may be a different size than the first augmented reality representation of the three-dimensional model.

The second augmented reality representation of the three-dimensional model may be a different configuration than the first augmented reality representation of the three-dimensional model.

The second augmented reality representation of the three-dimensional model may be a different orientation than the first augmented reality representation of the three-dimensional model.

The instructions may cause the one or more processors to revise the augmented media responsive to determining that a second type of the second surface matches the type of the first surface.

The instructions may cause the one or more processors to, responsive to identifying a third surface in the second view of the camera feed from the customer device where the third surface has a second type of surface not suitable for the three-dimensional model, revise the augmented media to contain a third augmented reality representation of a second three-dimensional model of a second product on the third surface in the second view.

The first augmented reality representation of the product may be positioned on the first surface based on a first anchoring point, wherein the instructions may cause the one or more processors to identify a change from the first anchoring point on the first surface to a second anchoring point on the first surface, and in response, repositioning, by the processor, the first augmented reality representation on the first surface based on the second anchoring point.

The first augmented reality representation of the product may be positioned on the first surface based on a first anchoring point, wherein the instructions may cause the one or more processors to identify a change from the first anchoring point on the first surface to a second anchoring point on the second surface, and in response, repositioning, by the processor, the first augmented reality representation on the second surface based on the second anchoring point.

The instructions may further cause the one or more processors to position at least one of the first augmented reality representation or the second augmented reality representation based on an anchoring point.

The product may have an attribute that matches a customer preference within a customer profile associated with the customer device.

The product may have an attribute that corresponds to an object identified within the camera feed.

In yet another embodiment, a computer system comprises a server having a processor, the server in communication with a customer device, the server configured to identify a first surface in a first view of a camera feed from the customer device; obtain a three-dimensional model of a product that corresponds to the first surface, wherein the correspondence of the product to the surface is based at least in part on a type of the first surface; provide an augmented media containing an overlay of a first augmented reality representation of the three-dimensional model of the product in the first view; and responsive to identifying a second surface in a second view of the camera feed from the customer device, revise the augmented media to contain a second augmented reality representation of the three-dimensional model of the product on the second surface in the second view.

The second augmented reality representation of the three-dimensional model may be a different size than the first augmented reality representation of the three-dimensional model.

In another embodiment, a method comprises providing, by a processor, a three-dimensional representation of a product in a virtual environment for display on a customer device; and responsive to the processor identifying a surface in a camera feed of the customer device having a dimensionality suitable for the product, generating, by the processor, an augmented media containing a augmented reality representation of a three-dimensional model for the product on the surface.

An attribute of the virtual environment may correspond to an attribute of a view within the camera feed.

An attribute of the virtual environment may correspond to an attribute of a defined space.

The attribute of the defined space may be determined based on a previous camera feed of the defined space.

The method may further comprise providing, by the processor, an input element configured to receive a selection from the customer device; and responsive to receiving the selection from the customer device, generating, by the processor, the augmented media.

The input element may be a toggle button.

The camera feed may be received while providing the three-dimensional representation of the product.

The method may further comprise providing, by the processor, a portion of a camera feed while providing the three-dimensional representation.

The method may further comprise monitoring, by the processor, the camera feed of the customer device, wherein the monitoring is initiated based on the processor determining that a customer is viewing the three-dimensional representation of the product.

In another embodiment, a machine-readable storage medium has computer-executable instructions stored thereon that, when executed by one or more processors, cause the one or more processors to perform operations comprising providing a three-dimensional representation of a product in a virtual environment for display on a customer device; and responsive to identifying a surface in a camera feed of the customer device having a dimensionality suitable for the product, generating an augmented media containing a augmented reality representation of a three-dimensional model for the product on the surface.

An attribute of the virtual environment may correspond to an attribute of a view within the camera feed.

An attribute of the virtual environment may correspond to an attribute of a defined space.

The attribute of the defined space may be determined based on a previous camera feed of the defined space.

The instructions may further cause the one or more processors to provide an input element configured to receive a selection from the customer device; and responsive to receiving the selection from the customer device, generate the augmented media.

The input element may be a toggle button.

The camera feed may be received while providing the three-dimensional representation of the product.

The instructions may further cause the one or more processors to provide a portion of a camera feed while providing the three-dimensional representation.

The instructions may further cause the one or more processors to monitor the camera feed of the customer device, wherein the monitoring is initiated based on determining that a customer is viewing the three-dimensional representation of the product.

In another embodiment, a system comprises a server having a processor, the server in communication with a customer device, the server configured to provide a three-dimensional representation of a product in a virtual environment for display on the customer device; and responsive to the processor identifying a surface in a camera feed of the customer device having a dimensionality suitable for the product, generate an augmented media containing a augmented reality representation of a three-dimensional model for the product on the surface.

An attribute of the virtual environment corresponds to an attribute of a view within the camera feed.

The foregoing method descriptions and the process flow diagrams are provided merely as illustrative examples and are not intended to require or imply that the operations of the various embodiments must be performed in the order presented. The operations in the foregoing embodiments may be performed in any order. Words such as "then," "next," etc., are not intended to limit the order of the operations; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Neither the claimed features nor this disclosure is limited in terms of particular software code or specialized control hardware being used to implement the subject matter disclosed herein. Thus, the operation and behavior of the systems and methods were described without reference to the specific software code being understood that software and control hardware can be provided to implement the systems and methods based on the description herein.

When implemented in software, the functions may be stored as one or more instructions or code on a non-transitory computer-readable or processor-readable storage medium. The operations of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
    identifying, by a processor, a first surface in a first view of a camera feed from a customer device;
    obtaining, by the processor, a three-dimensional model of a product that corresponds to the first surface, the correspondence of the product to the surface being based at least in part on a type of the first surface;
    providing, by the processor, an augmented media containing an overlay of a first augmented reality representation of the three-dimensional model of the product in the first view; and
    responsive to the processor identifying a second surface in a second view of the camera feed from the customer device while displaying the first augmented reality representation of the three-dimensional model of the product, automatically revising, by the processor, the augmented media to contain a second augmented reality representation of the three-dimensional model of the product suitable to fit on the second surface in the second view.

2. The method of claim 1, wherein the second augmented reality representation of the three-dimensional model is a different size than the first augmented reality representation of the three-dimensional model.

3. The method of claim 1, wherein the second augmented reality representation of the three-dimensional model is a different configuration than the first augmented reality representation of the three-dimensional model.

4. The method of claim 1, wherein the second augmented reality representation of the three-dimensional model is a different orientation than the first augmented reality representation of the three-dimensional model.

5. The method of claim 1, wherein the processor revises the augmented media responsive to determining that a second type of the second surface matches the type of the first surface.

6. The method of claim 1, further comprising:
    responsive to the processor identifying a third surface in the second view of the camera feed from the customer device where the third surface has a second type of surface not suitable for the three-dimensional model, revising, by the processor, the augmented media to contain a third augmented reality representation of a second three-dimensional model of a second product on the third surface in the second view.

7. The method of claim 1, further comprising:
    positioning, by the processor, at least one of the first augmented reality representation or the second augmented reality representation based on an anchoring point.

8. The method of claim 1, wherein the product has an attribute that matches a customer preference within a customer profile associated with the customer device.

9. The method of claim 1, wherein the product has an attribute that corresponds to an object identified within the camera feed.

10. A machine-readable storage medium having computer-executable instructions stored thereon that, when executed by one or more processors, cause the one or more processors to perform operations comprising:
    identifying a first surface in a first view of a camera feed from a customer device;
    obtaining a three-dimensional model of a product that corresponds to the first surface, wherein the correspondence of the product to the surface is based at least in part on a type of the first surface;
    providing an augmented media containing an overlay of a first augmented reality representation of the three-dimensional model of the product in the first view; and
    responsive to identifying a second surface in a second view of the camera feed from the customer device while displaying the first augmented reality representation of the three-dimensional model of the product, automatically revising the augmented media to contain a second augmented reality representation of the three-dimensional model of the product suitable to fit on the second surface in the second view.

11. The machine-readable storage medium of claim 10, wherein the second augmented reality representation of the three-dimensional model is a different size than the first augmented reality representation of the three-dimensional model.

12. The machine-readable storage medium of claim 10, wherein the second augmented reality representation of the three-dimensional model is a different configuration than the first augmented reality representation of the three-dimensional model.

13. The machine-readable storage medium of claim 10, wherein the second augmented reality representation of the three-dimensional model is a different orientation than the first augmented reality representation of the three-dimensional model.

14. The machine-readable storage medium of claim 10, wherein the instructions cause the one or more processors to revise the augmented media responsive to determining that a second type of the second surface matches the type of the first surface.

15. The machine-readable storage medium of claim 10, wherein the instructions cause the one or more processors to, responsive to identifying a third surface in the second view of the camera feed from the customer device where the third surface has a second type of surface not suitable for the three-dimensional model, revise the augmented media to contain a third augmented reality representation of a second three-dimensional model of a second product on the third surface in the second view.

16. The machine-readable storage medium of claim 10, wherein the instructions cause the one or more processors to:
  position at least one of the first augmented reality representation or the second augmented reality representation based on an anchoring point.

17. The machine-readable storage medium of claim 10, wherein the product has an attribute that matches a customer preference within a customer profile associated with the customer device.

18. The machine-readable storage medium of claim 10, wherein the product has an attribute that corresponds to an object identified within the camera feed.

19. A computer system comprising:
  a server having a processor, the server in communication with a customer device, the server configured to:
    identify a first surface in a first view of a camera feed from the customer device;
    obtain a three-dimensional model of a product that corresponds to the first surface, wherein the correspondence of the product to the surface is based at least in part on a type of the first surface;
    provide an augmented media containing an overlay of a first augmented reality representation of the three-dimensional model of the product in the first view; and
    responsive to identifying a second surface in a second view of the camera feed from the customer device while displaying the first augmented reality representation of the three-dimensional model of the product, automatically revise the augmented media to contain a second augmented reality representation of the three-dimensional model of the product suitable to fit on the second surface in the second view.

20. The computer system of claim 19, wherein the second augmented reality representation of the three-dimensional model is a different size than the first augmented reality representation of the three-dimensional model.

\* \* \* \* \*